(12) United States Patent
Matsuura

(10) Patent No.: US 12,489,994 B2
(45) Date of Patent: Dec. 2, 2025

(54) IMAGING DEVICE AND ELECTRONIC APPARATUS

(71) Applicant: SONY SEMICONDUCTOR SOLUTIONS CORPORATION, Kanagawa (JP)

(72) Inventor: Kouji Matsuura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 29 days.

(21) Appl. No.: 18/291,471

(22) PCT Filed: Mar. 29, 2022

(86) PCT No.: PCT/JP2022/015256
§ 371 (c)(1),
(2) Date: Jan. 23, 2024

(87) PCT Pub. No.: WO2023/026565
PCT Pub. Date: Mar. 2, 2023

(65) Prior Publication Data
US 2024/0340555 A1    Oct. 10, 2024

(30) Foreign Application Priority Data
Aug. 26, 2021    (JP) ................................. 2021-138350

(51) Int. Cl.
*H04N 25/585*    (2023.01)
*H04N 25/44*    (2023.01)
(Continued)

(52) U.S. Cl.
CPC .......... *H04N 25/585* (2023.01); *H04N 25/44* (2023.01); *H04N 25/59* (2023.01); *H04N 25/702* (2023.01);
(Continued)

(58) Field of Classification Search
CPC ...... H04N 25/44; H04N 25/585; H04N 25/59; H04N 25/702; H04N 25/767; H04N 25/771; H04N 25/75; H04N 25/78
See application file for complete search history.

(56) References Cited

U.S. PATENT DOCUMENTS

| | | | |
|---|---|---|---|
| 2004/0096124 A1* | 5/2004 | Nakamura | H04N 25/778 348/E3.019 |
| 2017/0221947 A1* | 8/2017 | Shishido | H10F 39/8037 |
| 2018/0091723 A1* | 3/2018 | Funaki | H04N 25/57 |

FOREIGN PATENT DOCUMENTS

| | | |
|---|---|---|
| JP | 2012-023466 A | 2/2012 |
| JP | 2017-175345 A | 9/2017 |

(Continued)

OTHER PUBLICATIONS

International Search Report and Written Opinion of PCT Application No. PCT/JP2022/015256, issued on Jun. 21, 2022, 09 pages of ISRWO.

*Primary Examiner* — Daniel M Pasiewicz
(74) *Attorney, Agent, or Firm* — CHIP LAW GROUP

(57) ABSTRACT

To increase the frame rate and reduce power consumption with a wide dynamic range for photoelectric conversion. An imaging device includes: a first photoelectric conversion unit; a first read-out circuit that outputs to a first signal line a first pixel signal corresponding to charges photoelectrically converted by the first photoelectric conversion unit; a second photoelectric conversion unit that has a smaller light-receiving area than the first photoelectric conversion unit; a second read-out circuit that outputs to a second signal line a second pixel signal corresponding to charges photoelectrically converted by the second photoelectric conversion unit; a pixel signal selector that selects the first pixel signal or the second pixel signal based on a result of comparing the second pixel signal with a reference signal;

(Continued)

and an analog-to-digital converter that converts the pixel signal selected by the pixel signal selector into a digital pixel signal by comparing the pixel signal with a reference signal whose potential level changes over time.

20 Claims, 19 Drawing Sheets

(51) Int. Cl.
*H04N 25/59* (2023.01)
*H04N 25/702* (2023.01)
*H04N 25/767* (2023.01)
*H04N 25/771* (2023.01)
*H04N 25/78* (2023.01)

(52) U.S. Cl.
CPC ......... *H04N 25/767* (2023.01); *H04N 25/771* (2023.01); *H04N 25/78* (2023.01)

(56) References Cited

FOREIGN PATENT DOCUMENTS

| | | | |
|---|---|---|---|
| JP | 2020-109971 | A | 7/2020 |
| WO | 2020/095544 | A1 | 5/2020 |

\* cited by examiner

IMAGING DEVICE AND ELECTRONIC APPARATUS

CROSS REFERENCE TO RELATED APPLICATIONS

This application is a U.S. National Phase of International Patent Application No. PCT/JP2022/015256 filed on Mar. 29, 2022, which claims priority benefit of Japanese Patent Application No. JP 2021-138350 filed in the Japan Patent Office on Aug. 26, 2021. Each of the above-referenced applications is hereby incorporated herein by reference in its entirety.

TECHNICAL FIELD

The present disclosure relates to an imaging device and an electronic apparatus.

BACKGROUND ART

There is known a complementary metal oxide semiconductor (CMOS) sensor (hereinafter also referred to as CIS) that performs analogue-to-digital (AD) conversion on a pixel signal in a manner that a comparator compares an analog pixel signal with a linearly changing reference signal and time is counted until the reference signal crosses the pixel signal.

There are various types of CIS, and a CIS with a wide dynamic range for photoelectric conversion has been proposed in which each pixel includes a plurality of photoelectric conversion elements with different light-receiving areas and AD conversion is performed with the sensitivity and charge-voltage conversion efficiency of the pixel switched in multiple ways (see PTL 1).

CITATION LIST

Patent Literature

[PTL 1]
JP 2017-175345A

SUMMARY

Technical Problem

Typical AD conversion is performed on a pixel column-by-column basis, and the pixels arranged in the row (line) direction need to be read out within a period of time for one horizontal line. There is a problem that for reading out each pixel while switching the sensitivity and conversion efficiency as described above, it takes time to read out, making it impossible to increase the frame rate. In addition, each time the sensitivity or conversion efficiency is switched, the pixel signal on the vertical signal line is required to be changed, increasing power consumption.

Therefore, the present disclosure provides an imaging device and an electronic apparatus that can increase the frame rate and reduce power consumption as well as with a wide dynamic range for photoelectric conversion.

Solution to Problem

In order to solve the above-described problems, an imaging device according to the present disclosure is provided, including:

a first photoelectric conversion unit;
a first read-out circuit that outputs to a first signal line a first pixel signal corresponding to charges photoelectrically converted by the first photoelectric conversion unit;
a second photoelectric conversion unit that has a smaller light-receiving area than the first photoelectric conversion unit;
a second read-out circuit that outputs to a second signal line a second pixel signal corresponding to charges photoelectrically converted by the second photoelectric conversion unit;
a pixel signal selector that selects the first pixel signal or the second pixel signal based on a result of comparing the second pixel signal with a reference signal; and
an analog-to-digital converter that converts the pixel signal selected by the pixel signal selector into a digital pixel signal by comparing the pixel signal with a reference signal whose potential level changes over time.

A plurality of pixels arranged in a first direction and a second direction may be included,
the first pixel signal and the second pixel signal that are output from each of two or more pixels arranged in the second direction may be output to the first signal line that is common and the second signal line that is common, respectively,
the analog-to-digital converter may be arranged for each pixel column including the two or more pixels arranged in the second direction,
each of the plurality of pixels may include the first photoelectric conversion unit, the first read-out circuit, the second photoelectric conversion unit, and the second read-out circuit, and
the pixel signal selector may be provided for each pixel column arranged in the second direction.

The analog-to-digital converter may include
a comparator that compares the pixel signal selected by the pixel signal selector with the reference signal, and
a counter that performs a count operation until the comparator detects a match between the pixel signal and the reference signal, and
generate based on a count value of the counter the digital pixel signal corresponding to the pixel signal selected by the pixel signal selector.

The comparator may determine whether or not an illuminance at start of imaging is equal to or greater than a predetermined reference level, based on a comparison between the pixel signal selected by the pixel signal selector and the reference signal, and
the pixel signal selector may select the second pixel signal when the illuminance at start of imaging is equal to or greater than the reference level, and select the first pixel signal when the illuminance is less than the reference level.

A first floating diffusion region that accumulates charges photoelectrically converted by the first photoelectric conversion unit, and
a second floating diffusion region that accumulates charges photoelectrically converted by the second photoelectric conversion unit may be included,
the pixel signal selector may select the first pixel signal or the second pixel signal based on a result of comparing, by the comparator, with the reference signal, the second pixel signal corresponding to the charges photoelectrically converted by the second photoelectric conversion unit and accumulated in the second floating diffusion region.

At start of imaging, the comparator may perform first comparison processing that compares with the reference signal the second pixel signal corresponding to a potential of the second floating diffusion region in a state in which the charges in the second floating diffusion region have been discharged, and then perform second comparison processing that compares with the reference signal the second pixel signal corresponding to the charges photoelectrically converted by the second photoelectric conversion unit and accumulated in the second floating diffusion region, and the pixel signal selector may select the first pixel signal or the second pixel signal based on a result of the second comparison processing.

The comparator may determine whether or not the illuminance at start of imaging is equal to or greater than the reference level by the second comparison processing, and the pixel signal selector may select the second pixel signal when the illuminance is equal to or greater than the reference level, and select the first pixel signal when the illuminance is less than the reference level.

When the illuminance is determined to be equal to or greater than the reference level in the second comparison processing, the comparator may perform third comparison processing that compares with the reference signal the second pixel signal corresponding to the charges photoelectrically converted by the second photoelectric conversion unit and accumulated in the second floating diffusion region, and then perform fourth comparison processing that compares with the reference signal the second pixel signal corresponding to a potential of the second floating diffusion region in a state in which the charges in the second floating diffusion region have been discharged.

The first read-out circuit may have variable charge-voltage conversion efficiency, and when the illuminance is determined to be less than the reference level in the second comparison processing, the comparator may perform fifth comparison processing that compares with the reference signal the first pixel signal corresponding to a potential of the first floating diffusion region in a state in which the charges in the first floating diffusion region have been discharged, then perform sixth comparison processing that compares with the reference signal the first pixel signal corresponding to a potential of the first floating diffusion region in a state in which the charges in the first floating diffusion region have been discharged with a higher charge-potential conversion efficiency than in the fifth comparison processing, then perform seventh comparison processing that compares with the reference signal the first pixel signal corresponding to the charges photoelectrically converted by the first photoelectric conversion unit with a same charge-potential conversion efficiency as in the sixth comparison processing, and then perform eighth comparison processing that compares with the reference signal the first pixel signal corresponding to the charges photoelectrically converted by the first photoelectric conversion unit with a same charge-potential conversion efficiency as in the fifth comparison processing.

The comparator may include a first differential transistor pair that compares the pixel signal selected by the pixel signal selector with the reference signal when the illuminance is determined to be less than the reference level in the second comparison processing, and a second differential transistor pair that compares the pixel signal selected by the pixel signal selector with the reference signal when the first comparison processing is performed and when the illuminance is determined to be equal to or greater than the reference level in the second comparison processing.

The first differential transistor pair may include a first transistor and a second transistor, the second differential transistor pair may include a third transistor and a fourth transistor, and the comparator may include a first switch and a first capacitor that are connected in series between a gate of the first transistor and an output node of the pixel signal selector, a second switch and a second capacitor that are connected in series between a gate of the second transistor and an input node for the reference signal, a third switch and a third capacitor that are connected in series between a gate of the third transistor and an output node of the pixel signal selector, a fourth switch and a fourth capacitor that are connected in series between a gate of the fourth transistor and an input node for the reference signal, a fifth switch that switches whether or not to short-circuit the gate and a drain of the first transistor, a sixth switch that switches whether or not to short-circuit the gate and a drain of the second transistor, a seventh switch that switches whether or not to short-circuit the gate and a drain of the third transistor, and an eighth switch that switches whether or not to short-circuit the gate and a drain of the fourth transistor.

At start of imaging at each pixel, the comparator may turn off the first switch, the second switch, the third switch, and the fourth switch, and turn on the fifth switch and the sixth switch, and turn on once and then turn off the seventh switch and the eighth switch to accumulate charges corresponding to the second pixel signal selected by the pixel signal selector in the third capacitor and to accumulate charges corresponding to the reference signal in the fourth capacitor.

A sample-and-hold circuit may be included that includes a first hold circuit and a second hold circuit that alternately hold the pixel signal selected by the pixel signal selector, and a sample-and-hold selector that alternately selects and outputs the pixel signals held by the first and second hold circuits, and the analog-to-digital converter may convert an output signal of the sample-and-hold circuit into the digital pixel signal.

During a period in which one of the first and second hold circuits inputs the held pixel signal to the analog-to-digital converter, the other of the first and second hold circuits may hold the pixel signal selected by the pixel signal selector.

The analog-to-digital converter may include a comparator that compares an output signal of the sample-and-hold circuit with the reference signal, and a counter that performs a count operation until the comparator detects a match between the output signal and the reference signal, and generate based on a count value of the counter the digital pixel signal corresponding to the pixel signal selected by the pixel signal selector.

The comparator may determine whether or not an illuminance at start of imaging is equal to or greater than a predetermined reference level, based on a comparison between the output signal of the sample-and-hold circuit and the reference signal, and the pixel signal selector may select the second pixel signal when the illuminance at start of imaging is equal to or greater than the reference level, and select the first pixel signal when the illuminance is less than the reference level.

A first floating diffusion region that accumulates charges photoelectrically converted by the first photoelectric conversion unit, and a second floating diffusion region that accumulates charges photoelectrically converted by the second photoelectric conversion unit may be included, the pixel signal selector may select the first pixel signal or the second pixel signal based on a result of comparing, by the comparator, with the reference signal, the second pixel signal corresponding to the charges photoelectrically converted by the second photoelectric conversion unit and accumulated in the second floating diffusion region.

At start of imaging, the first hold circuit may hold the second pixel signal corresponding to a potential of the second floating diffusion region in a state in which the charges in the second floating diffusion region have been discharged, and then input the held second pixel signal to the comparator, the second hold circuit may hold, in synchronization with a timing at which the first hold circuit inputs the second pixel signal to the comparator, the second pixel signal corresponding to the charges photoelectrically converted by the second photoelectric conversion unit and accumulated in the second floating diffusion region, and then input the held second pixel signal to the comparator, and the pixel signal selector may select the first pixel signal or the second pixel signal based on a result of comparing, by the comparator, the second pixel signal output from the second hold circuit with the reference signal.

The sample-and-hold circuit may be configured to output at least one or some of pixel signals selected by the pixel signal selector without holding the at least one or some of pixel signals, and when the comparator determines that the second pixel signal is less than the reference signal, the sample-and-hold circuit may input at least one or some of pixel signals selected by the pixel signal selector to the comparator without holding the at least one or some of pixel signals.

An electronic apparatus according to the present disclosure is provided, including:

an imaging device that outputs a digital pixel signal corresponding to a pixel signal obtained by imaging; and a signal processing unit that performs signal processing based on the digital pixel signal, wherein the imaging device includes a first photoelectric conversion unit;

a first read-out circuit that outputs to a first signal line a first pixel signal corresponding to charges photoelectrically converted by the first photoelectric conversion unit;

a second photoelectric conversion unit that has a smaller light-receiving area than the first photoelectric conversion unit;

a second read-out circuit that outputs to a second signal line a second pixel signal corresponding to charges photoelectrically converted by the second photoelectric conversion unit;

a pixel signal selector that selects the first pixel signal or the second pixel signal based on a result of comparing the second pixel signal with a reference signal; and an analog-to-digital converter that converts the pixel signal selected by the pixel signal selector into a digital pixel signal by comparing the pixel signal with a reference signal whose potential level changes over time.

DESCRIPTION OF EMBODIMENTS

Hereinafter, embodiments of an imaging device and electronic apparatus will be described with reference to the drawings. Although main components of the imaging device and the electronic apparatus will be mainly described below, the imaging device and the electronic apparatus may include components and functions that are not illustrated or explained. The following description does not exclude components or functions that are not illustrated or mentioned.

First Embodiment

Figure 1:
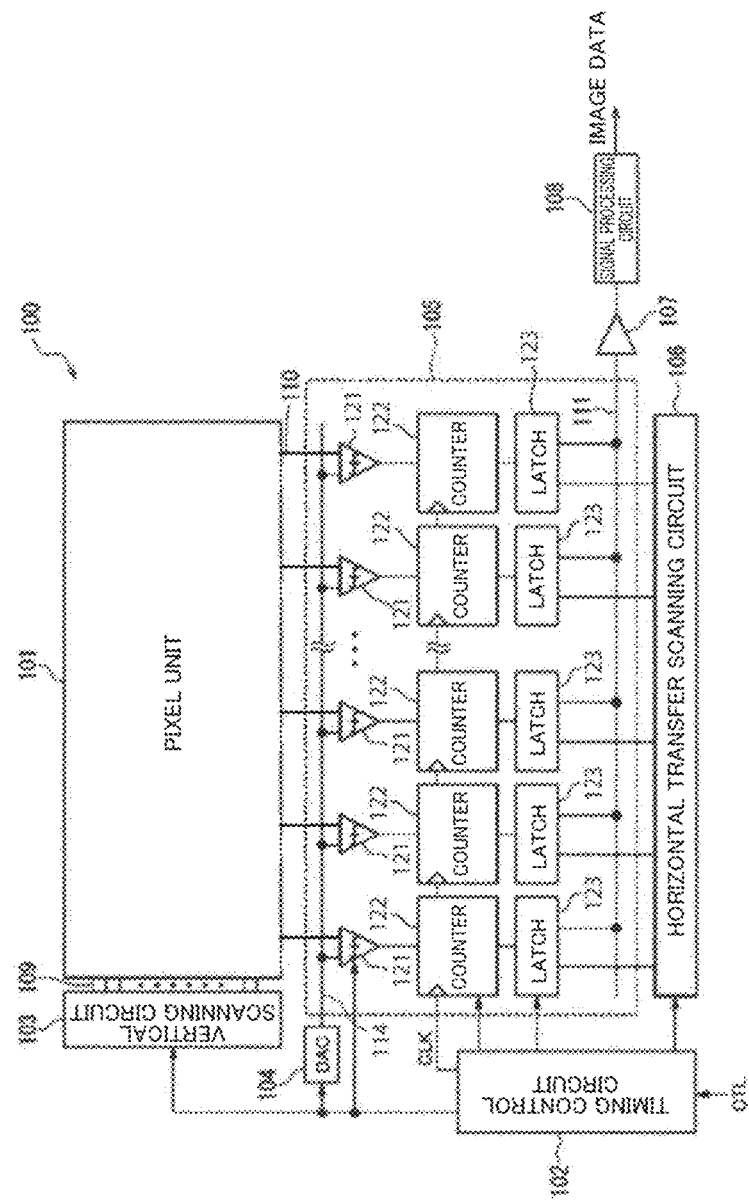
FIG. 1 is a block diagram illustrating a schematic configuration of an imaging device according to a first embodiment of the present disclosure.

FIG. 1 is a block diagram illustrating a schematic configuration of an imaging device 100 according to a first embodiment of the present disclosure. The imaging device 100 includes a pixel array unit 101, a timing control circuit 102, a vertical scanning circuit 103, a digital-to-analog converter (DAC) 104, an analog-to-digital converter (ADC) group 105, a horizontal transfer scanning circuit 106, an amplifier circuit 107, and a signal processing circuit 108.

In the pixel array unit 101, unit pixels (hereinafter also simply referred to as pixels) including photoelectric conversion elements that photoelectrically convert incident light into an amount of charge (pixel signal) corresponding to the amount of light are arranged in a matrix. The specific circuit configuration of the unit pixel will be described later with reference to FIG. 2. In the pixel array unit 101, pixel drive lines 109 are wired for each row of the pixels arranged in the matrix along the left-right direction (pixel arrangement direction/horizontal direction of pixel row) in the figure, and vertical signal lines VSL are wired for each column along the up-down direction (pixel arrangement direction/vertical direction of pixel column) in the figure. One end of the pixel drive line 109 is connected to an output terminal corresponding to each row of the vertical scanning circuit 103. Although FIG. 1 illustrates one pixel drive line 109 for each pixel row, two or more pixel drive lines 109 may be provided for each pixel row.

The timing control circuit 102 includes a timing generator (not illustrated) that generates various timing signals. In response to control signals and the like given from the outside, the timing control circuit 102 controls the drive of the vertical scanning circuit 103, the DAC 104, the ADC group 105, the horizontal transfer scanning circuit 106, and others based on various timing signals generated by the timing generator.

The vertical scanning circuit 103 is constituted by a shift register, an address decoder, or the like. Although a specific configuration of the vertical scanning circuit 103 is not illustrated, the vertical scanning circuit 103 includes a read-out scanning system and a sweep-out scanning system.

The read-out scanning system selectively scans unit pixels from which signals are to be read out, on a row-by-row basis in order. On the other hand, the sweep-out scanning system performs, on a read-out row to be selectively scanned by the read-out scanning system, a sweep-out scan that sweeps out (resets) unnecessary charges from the photoelectric conversion elements of the unit pixels of the read-out row a shutter speed time in advance of the read-out scan. A so-called electronic shutter operation is performed by the sweep-out (reset) of unnecessary charges by the sweep-out scanning system. The electronic shutter operation as used herein refers to an operation of discarding the photocharges of the photoelectric conversion element and starting new exposure (starting accumulation of photocharges). The signal read out by the read-out operation of the read-out scanning system corresponds to an amount of light incident after the previous read-out operation or the electronic shutter operation. The period from the read-out timing of the previous read-out operation or the sweep-out timing of the electronic shutter operation to the read-out timing of the current read-out operation is a photocharge accumulation time (exposure time) for the unit pixel.

Pixel signals (analog signals) output from the unit pixels in a pixel row selectively scanned by the vertical scanning circuit 103 are supplied to the ADC group 105 through a plurality of vertical signal lines VSL corresponding to the respective columns.

The DAC 104 generates a reference signal RAMP, which is a ramp waveform signal that changes linearly, and supplies the reference signal RAMP to the ADC group 105. The DAC 104 is commonly connected to a plurality of comparators 121 through a reference signal line 114, and supplies the same reference signal RAMP to a plurality of comparators 121. The reference signal line 114 transmits the reference signal RAMP to the plurality of comparators 121.

The ADC group 105 includes the plurality of comparators 121, a plurality of counters 122, and a plurality of latch circuits 123. The ADC group 105 converts pixel signals (analog signals) from the pixel array unit 101 into digital signals.

The comparator 121, the counter 122, and the latch circuit 123 are provided for each pixel column of the pixel array unit 101, and constitute an ADC 105a. The ADC 105a is provided for each pixel column in the column direction.

The comparator 121 compares with a predetermined reference voltage the voltage of a signal obtained by adding a pixel signal output from each pixel and the reference signal RAMP via a capacitor, and supplies an output signal indicating the comparison result to the counter 122.

The counter 122 counts based on the output signal of the comparator 121 the time until the voltage magnitude relationship between the pixel signal and the reference signal RAMP is reversed. Thus, the analog pixel signal is converted into a digital pixel signal represented by a count value. The counter 122 supplies the count value to the latch circuit 123.

The latch circuit 123 holds the count value supplied from the counter 122. The latch circuit 123 also performs correlated double sampling (CDS) by obtaining a difference between a count value for a data signal corresponding to a pixel signal with a signal level and a count value for a reset signal corresponding to a pixel signal with a reset level.

The horizontal transfer scanning circuit 106 is constituted by a shift register, an address decoder, or the like, and selectively scans circuit portions corresponding to the respective pixel columns of the ADC group 105 in order. By this selective scan by the horizontal transfer scanning circuit 106, the digital pixel signals held in the latch circuits 123 are transferred to the amplifier circuit 107 through a horizontal transfer line 111 in order.

The amplifier circuit 107 amplifies the digital pixel signal supplied from the latch circuit 123 and supplies the resulting signal to the signal processing circuit 108.

The signal processing circuit 108 performs predetermined signal processing on the digital pixel signal supplied from the amplifier circuit 107 to generate two-dimensional image data. For example, the signal processing circuit 108 performs correction on vertical line defects or point defects, or signal clamping, and also performs digital signal processing such as parallel-to-serial conversion, compression, encoding, addition, averaging, and intermittent operation. The signal processing circuit 108 outputs the generated image data to a subsequent device.

Note that the imaging device 100 illustrated in FIG. 1 may be configured as a single semiconductor chip as a whole, or may be configured as a plurality of semiconductor chips. For the imaging device 100 configured as a plurality of semiconductor chips, the pixel array unit 101 and other processing circuits may be formed as separate semiconductor chips 511 and 512, respectively, in which the semiconductor chips 511 and 512 are stacked one on another.

Figure 2:
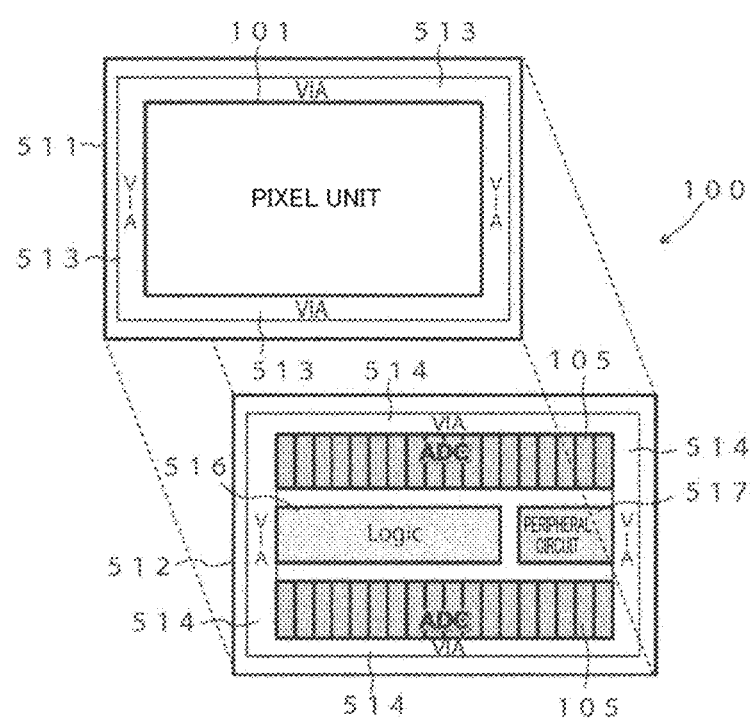
FIG. 2 is a conceptual diagram illustrating an example of an imaging device in which a semiconductor chip of a pixel array unit and a semiconductor chip of processing circuits are stacked one on another.

For example, FIG. 2 is a conceptual diagram illustrating an example of the imaging device 100 in which the semiconductor chip 511 of the pixel array unit 101 and the semiconductor chip 512 of the processing circuits are stacked one on another. As illustrated in FIG. 2, the imaging device 100 is constituted by two stacked semiconductor chips 511 and 512. Note that the number of stacked layers of semiconductor chips may be three or more.

The semiconductor chip 511 includes the pixel array unit 101 formed on a semiconductor substrate. The semiconductor chip 512 includes the ADC group 105, a logic circuit 516, and a peripheral circuit 517, which are formed on another semiconductor substrate. The logic circuit 516 includes the timing control circuit 102, the vertical scanning circuit 103, the DAC 104, the horizontal transfer scanning circuit 106, and others. The peripheral circuit 517 includes the signal processing circuit 108 and others.

The pixels of the pixel array unit 101 of the semiconductor chip 511 and the elements of the processing circuits (105, 516, 517) of the semiconductor chip 512 may be electrically connected to each other using through electrodes such as through silicon vias (TSVs) provided in via regions 513 and 514, for example. The ADC group 105 can transmit and receive signals to and from the pixel array unit 101 through the TSVs. Both semiconductor chips may be bonded together so that the wires of the semiconductor chip 511 and the wires of the semiconductor chip 512 are in contact with each other (Cu—Cu bonding). Although not illustrated, the pixel array unit 101 and part of the processing circuits (105, 516, 517) may be configured as one semiconductor chip 511, and the other components may be configured as the other semiconductor chip 512.

Each pixel in the pixel unit in FIG. 1 outputs a pixel signal with a high dynamic range (hereinafter also referred to as HDR). Prior to explanation of a specific configuration of the pixel according to the first embodiment, a basic configuration of the high dynamic range pixel will be described.
(Basic Configuration of High Dynamic Range Pixel)

Figure 3:
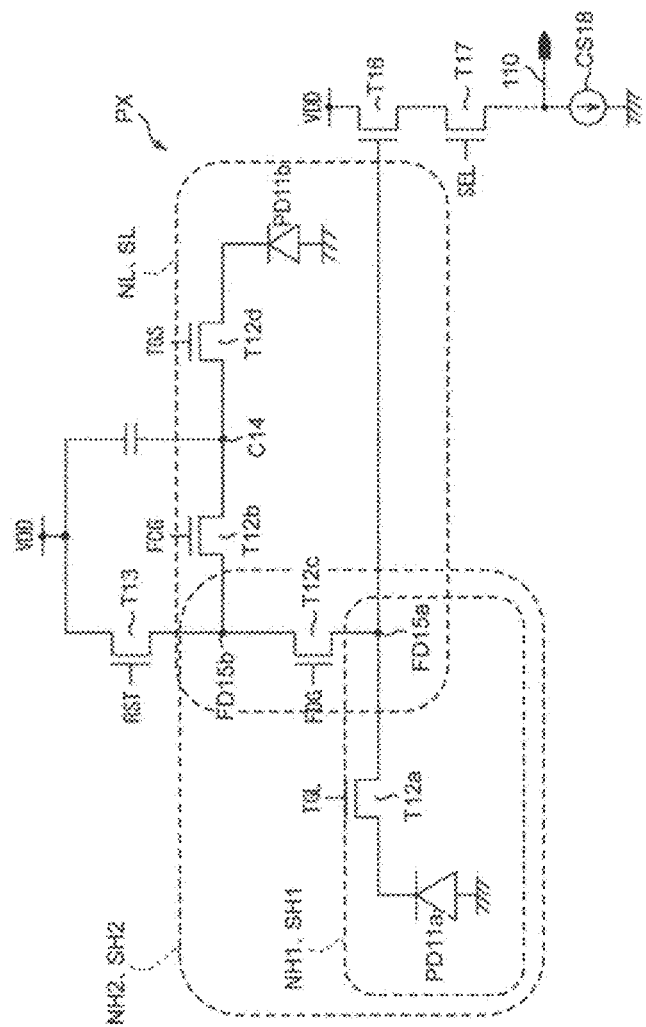
FIG. 3 is a circuit diagram illustrating a basic configuration of a pixel with a high dynamic range.

FIG. 3 is a circuit diagram illustrating the basic configuration of the high dynamic range pixel. The pixel PX of FIG. 3 is configured to include a first photoelectric conversion unit PD11a, a second photoelectric conversion unit PD11b, first to fourth transfer gate units T12a to T12d, a reset transistor T13, a charge accumulation unit C14, a first floating diffusion region FD15a, a second floating diffusion region unit FD15b, an amplifier transistor T16, and a selection transistor T17.

A plurality of pixels PX of FIG. 3 are arranged in the row direction and in the column direction, and the pixel drive line 109 in FIG. 1 is provided for each row of pixels arranged in the row direction. Various drive signals TGL, FCG, FDG, TGS, RST, and SEL are supplied from the vertical scanning circuit 103 in FIG. 1 through a plurality of drive lines.

The first photoelectric conversion unit PD11a includes, for example, a PN junction photodiode. The first photoelectric conversion unit PD11a generates and accumulates charges corresponding to an amount of light received. As with the first photoelectric conversion unit PD11a, the second photoelectric conversion unit PD11b includes, for example, a PN junction photodiode. The second photoelectric conversion unit PD11b generates and accumulates charges corresponding to an amount of light received.

Comparing the first photoelectric conversion unit PD11a and the second photoelectric conversion unit PD11b, the first photoelectric conversion unit PD11a has a larger light-receiving surface area and higher sensitivity than the second photoelectric conversion unit PD11b.

The first transfer gate unit T12a is connected between the first photoelectric conversion unit PD11a and the first floating diffusion region FD15a. The drive signal TGL is applied to the gate electrode of the first transfer gate unit T12a. When the drive signal TGL becomes active, the first transfer gate unit T12a becomes conductive, and the charges accumulated in the first photoelectric conversion unit PD11a are transferred to the first floating diffusion region FD15a through the first transfer gate unit T12a.

The second transfer gate unit T12b is connected between the charge accumulation unit 104 and the second floating diffusion region FD15b. The drive signal FCG is applied to the gate electrode of the second transfer gate unit T12b. When the drive signal FCG becomes active, the second transfer gate unit T12b becomes conductive, and the potentials of the charge accumulation unit 104 and the second floating diffusion region FD15b are coupled.

The conversion efficiency switching transistor T12c is connected between the first floating diffusion region FD15a and the second floating diffusion region FD15b. The drive signal FDG is applied to the gate electrode of the conversion efficiency switching transistor T12c. When the drive signal FDG becomes active, the conversion efficiency switching transistor T12c becomes conductive, and the potentials of the first floating diffusion region FD15a and the second floating diffusion region FD15b are coupled.

The fourth transfer gate unit T12d is connected between the second photoelectric conversion unit PD11b and the charge accumulation unit C14. The drive signal TGS is applied to the gate electrode of the fourth transfer gate unit T12d. When the drive signal TGS becomes active, the fourth transfer gate unit T12d becomes conductive, and the charges accumulated in the second photoelectric conversion unit PD11b are transferred to the charge accumulation unit C14 through the fourth transfer gate unit T12d.

A lower part of the gate electrode of the fourth transfer gate unit T12d has a slightly deep potential, where an overflow path is formed to transfer, to the charge accumulation unit C14, charges that exceed the saturation charge amount of the second photoelectric conversion unit PD11b and accordingly overflow from the second photoelectric conversion unit PD11b. Hereinafter, the overflow path formed at the lower part of the gate electrode of the fourth transfer gate unit T12d will be simply referred to as the overflow path of the fourth transfer gate unit T12d.

The reset transistor T13 is connected between a power supply that supplies a power supply voltage VDD (hereinafter, the power supply may also be referred to as VDD) and the second floating diffusion region FD15b. The drive signal RST is applied to the gate electrode of the reset transistor T13. When the drive signal RST becomes active, the reset transistor T13 becomes conductive. As a result, for example, the potential of a region where the potentials of the first floating diffusion region FD15a and the second floating diffusion region FD15b are coupled, or the potential of a region where the potentials of the charge accumulation unit C14, the first floating diffusion region FD15a, and the second floating diffusion region FD15b are coupled, is reset to the level of the power supply voltage VDD.

The charge accumulation unit C14 is made from, for example, a capacitor, and the opposing electrode of the charge accumulation unit C14 is connected to the power supply VDD. The charge accumulation unit C14 accumulates charges transferred from the second photoelectric conversion unit PD11b.

The first floating diffusion region FD15a and the second floating diffusion region FD15b perform charge-to-voltage conversion on the charges in the first photoelectric conversion unit PD11a or the second photoelectric conversion unit PD11b to generate a voltage signal and output the voltage signal. By electrically coupling or decoupling the first floating diffusion region FD15a and the second floating diffusion region FD15b, the capacitance of the entire floating diffusion region of the pixel PX can be switched. By switching the capacitance of the floating diffusion region of the pixel PX, the pixel PX can output pixel signals with a plurality of charge-voltage conversion efficiencies.

The amplifier transistor T16, in which the gate electrode thereof is connected to the first floating diffusion region FD15a and the drain electrode thereof is connected to the power supply VDD, serves as an input part of a read-out circuit that reads out the charges held in the first floating diffusion region FD15a, a so-called source follower circuit. In other words, the amplifier transistor T16 constitutes a source follower circuit with a constant current source CS18 connected to one end of the vertical signal line VSL by the source electrode thereof being connected to the vertical signal line VSL through the selection transistor T17.

The selection transistor T17 is connected between the source electrode of the amplifier transistor T16 and the vertical signal line VSL. The drive signal SEL is applied to the gate electrode of the selection transistor T17. When the drive signal SEL becomes active, the selection transistor T17 becomes conductive, and the pixel PX of FIG. 3 becomes selected. Accordingly, the pixel signal output from the amplifier transistor T16 is output to the vertical signal line VSL through the selection transistor T17.

Hereinafter, a driving signal becoming active is also referred to a driving signal being turned on, and a driving signal becoming inactive is also referred to as a driving signal being turned off. In addition, hereinafter, a gate unit or a transistor becoming conductive is also referred to as a gate unit or a transistor being turned on, and a gate unit or a transistor becoming non-conductive is also referred to as a gate unit or a transistor being turned off.

(Example of Operation of Pixel PX of FIG. 3 at Start of Exposure)

Figure 4:
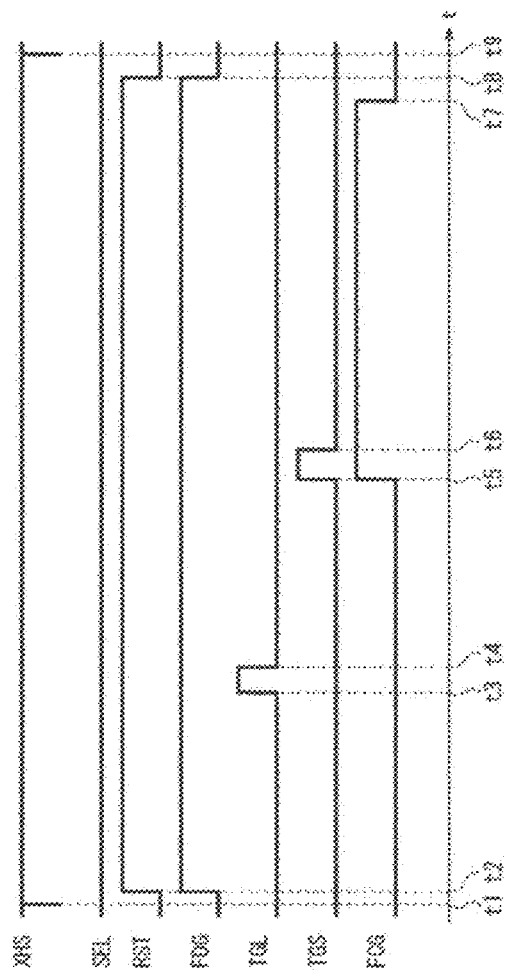
FIG. 4 is a timing chart at the start of exposure of the pixel of FIG. 3.

First, an example of the operation of the pixel PX of FIG. 3 at the start of exposure will be described with reference to a timing chart of FIG. 4. This processing is performed, for example, for each pixel row of the pixel array unit 101 or for every two or more pixel rows in a predetermined scanning order. FIG. 4 illustrates a timing chart of a horizontal synchronization signal XHS and the drive signals SEL, RST, FDG, TGL, TGS, and FCG.

First, at time t1, the horizontal synchronization signal XHS is input, and the exposure processing of the pixel PX of FIG. 3 starts accordingly.

Next, at time t2, the drive signals RST and FDG are turned on, and the reset transistor T13 and the conversion efficiency switching transistor T12c are turned on accordingly. As a result, the potentials of the first floating diffusion region FD15a and the second floating diffusion region FD15b are coupled, and the potential of the coupled region is reset to the level of the power supply voltage VDD.

Next, at time t3, the drive signal TGL is turned on, and the first transfer gate unit T12a is turned on accordingly. As a result, the charges accumulated in the first photoelectric conversion unit PD11a are transferred through the first transfer gate unit T12a to the region where the potentials of the first floating diffusion region FD15a and the second floating diffusion region FD15b are coupled, and accordingly, the first photoelectric conversion unit PD11a is reset.

Next, at time t4, the drive signal TGL is turned off, and the first transfer gate unit T12a is turned off accordingly. As a result, accumulation of charges in the first photoelectric conversion unit PD11a starts, and an exposure period starts accordingly.

Next, at time t5, the drive signals TGS and FCG are turned on, and the fourth transfer gate unit T12d and the second transfer gate unit T12b are turned on accordingly. As a result, the potentials of the charge accumulation unit C14, the first floating diffusion region FD15a, and the second floating diffusion region FD15b are combined. In addition, the charges accumulated in the second photoelectric conversion unit PD11b are transferred to the coupled region through the fourth transfer gate unit T12d, and accordingly, the second photoelectric conversion unit PD11b and the charge accumulation unit C14 are reset.

Next, at time t6, the drive signal TGS is turned off, and the fourth transfer gate unit T12d is turned off accordingly. As a result, accumulation of charges in the second photoelectric conversion unit PD11b starts.

Next, at time t7, the drive signal FCG is turned off, and the second transfer gate unit T12b is turned off accordingly. As a result, the charge accumulation unit C14 starts accumulating charges that overflow from the second photoelectric conversion unit PD11b and are then transferred through the overflow path of the fourth transfer gate unit T12d.

Next, at time t8, the drive signals RST and FDG are turned off, and the reset transistor T13 and the conversion efficiency switching transistor T12c are turned off accordingly.

Then, at time t9, the horizontal synchronization signal XHS is input.

(Example of Operation of Pixel PX of FIG. 3 at Read-Out)

Figure 5:
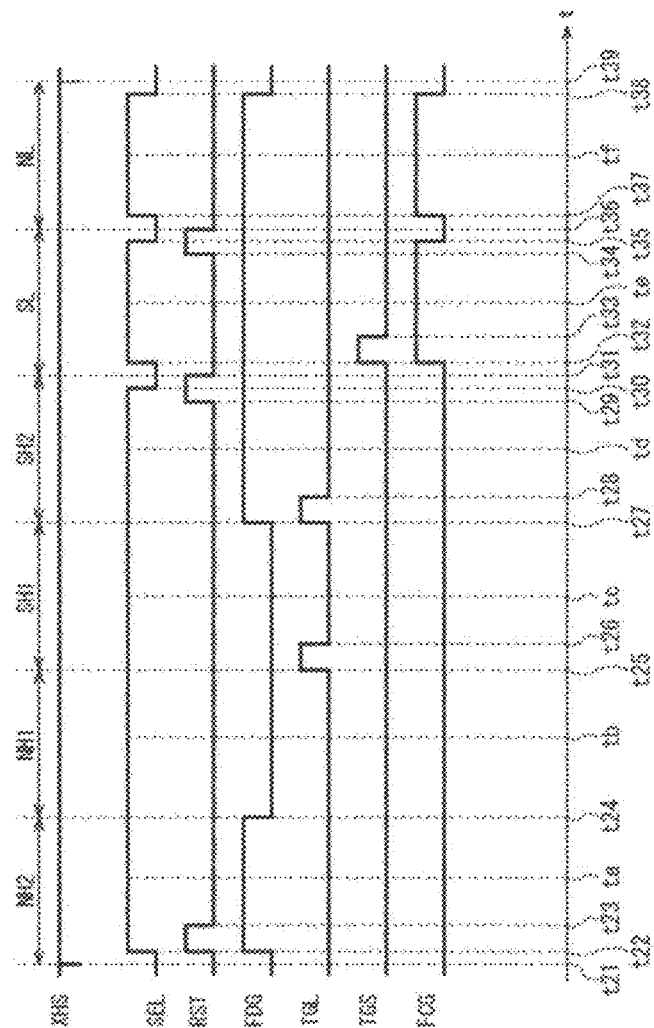
FIG. 5 is a timing chart at the read-out of a pixel signal in FIG. 3.

Next, an example of the operation of the pixel PX of FIG. 3 at the read-out of an pixel signal will be described with reference to a timing chart in FIG. 5. This processing is performed, for example, for each pixel row of the pixel array unit 101 or for every two or more pixel rows in a predetermined scanning order after a predetermined period of time from the processing of FIG. 4. FIG. 5 illustrates a timing chart of the horizontal synchronization signal XHS and the drive signals SEL, RST, FDG, TGL, TGS, and FCG.

First, at time t21, the horizontal synchronization signal XHS is input, and a read-out period of the pixel PX of FIG. 3 starts accordingly.

Next, at time t22, the drive signals SEL, RST, and FDG are turned on, and the selection transistor T17, the reset transistor T13, and the conversion efficiency switching transistor T12c are turned on. As a result, the pixel PX of FIG. 3 becomes selected. In addition, the potentials of the first floating diffusion region FD15a and the second floating diffusion region FD15b are coupled, and the potential of the coupled region is reset to the level of the power supply voltage VDD.

Next, at time t23, the drive signal RST is turned off, and the reset transistor T13 is turned off accordingly.

Next, at time ta between time t23 and time t24, a signal NH2 based on the potential of the coupled first floating diffusion region FD15a and second floating diffusion region FD15b is output to the vertical signal line VSL through the amplifier transistor T16 and the selection transistor T17. The signal NH2 is a signal obtained by detecting the reset state of the first photoelectric conversion unit PD11a and the floating diffusion regions FD15a and FD15b in FIG. 3 by using the region where the first floating diffusion region FD15a and the second floating diffusion region FD15b are coupled.

Hereinafter, the signal NH2 will also be referred to as the high sensitivity reset signal NH2.

Next, at time t24, the drive signal FDG is turned off, and the conversion efficiency switching transistor T12c is turned off. As a result, the potential coupling between the first floating diffusion region FD15a and the second floating diffusion region FD15b is eliminated.

Next, at time tb between time t24 and time t25, a signal NH1 based on the potential of the first floating diffusion region FD15a is output to the vertical signal line VSL through the amplifier transistor T16 and the selection transistor T17. The signal NH1 is a signal obtained by detecting the reset state of the first photoelectric conversion unit PD11a and the first floating diffusion region FD15a in FIG. 3 by using the first floating diffusion region FD15a.

Hereinafter, the signal NH1 will also be referred to as the high sensitivity reset signal NH1.

Next, at time t25, the drive signal TGL is turned on, and the first transfer gate unit T12a is turned on accordingly. As a result, the charges generated and accumulated in the first photoelectric conversion unit PD11a during the exposure period are transferred to the first floating diffusion region FD15a through the first transfer gate unit T12a.

At this time t25, read-out of the pixel signal starts, and the exposure period ends accordingly.

Next, at time t26, the drive signal TGL is turned off, and the first transfer gate unit T12a is turned off accordingly. As a result, the transfer of charges from the first photoelectric conversion unit PD11a to the first floating diffusion region FD15a is stopped.

Next, at time tc between time t26 and time t27, a signal SH1 based on the potential of the first floating diffusion region FD15a is output to the vertical signal line VSL through the amplifier transistor T16 and the selection transistor T17. The signal SH1 is a signal based on the potential of the first floating diffusion region FD15a when the charges generated in the first photoelectric conversion unit PD11a are accumulated in the first floating diffusion region FD15a during the exposure period.

Hereinafter, the signal SH1 will also be referred to as the high sensitivity data signal SH1.

Next, at time t27, the drive signals FDG and TGL are turned on, and the conversion efficiency switching transistor T12c and the first transfer gate unit T12a are turned on accordingly. As a result, the potentials of the first floating diffusion region FD15a and the second floating diffusion region FD15b are coupled, and the charges that remain in the first photoelectric conversion unit PD11a and are completely transferred in a period of time t25 to time t26 are transferred to the combined region through the first transfer gate unit T12a. Note that the charges remaining even in the first photoelectric conversion unit PD11a at the read-out of the high sensitivity data signal SH1 have no problem because the capacitance for charge-to-voltage conversion is small relative to the amount of charge to be treated. The charges remaining in the first photoelectric conversion unit PD11a only need to be transferred at the read-out of the high sensitivity data signal SH2, and the charges in the first photoelectric conversion unit PD11a are not useless.

Next, at time t28, the drive signal TGL is turned off, and the first transfer gate unit T12a is turned off accordingly. As a result, the transfer of charges from the first photoelectric conversion unit PD11a to the region where the potentials of the first floating diffusion region FD15a and the second floating diffusion region FD15b are coupled is stopped.

Next, at time td between time t28 and time t29, a signal SH2 based on the potential of the region where the first floating diffusion region FD15a and the second floating diffusion region FD15b are coupled is output to the vertical signal line VSL through the amplifier transistor T16 and the selection transistor T17. The signal SH2 is a signal based on the potential of the region where the first floating diffusion region FD15a and the second floating diffusion region FD15b are coupled when the charges generated in the first photoelectric conversion unit PD11a are accumulated in the region where the first floating diffusion region FD15a and the second floating diffusion region FD15b are coupled during the exposure period. Therefore, the capacitance for charge-to-voltage conversion at the read out of the signal SH2 is the combined capacitance of the first floating diffusion region FD15a and the second floating diffusion region FD15b, which is larger than that at the read-out of the high sensitivity data signal SH1 at time tc.

Hereinafter, the signal SH2 will also be referred to as the high sensitivity data signal SH2.

Next, at time t29, the drive signal RST is turned on, and the reset transistor T13 is turned on accordingly. As a result, the potential of the region where the first floating diffusion region FD15a and the second floating diffusion region FD15b are coupled is reset to the level of the power supply voltage VDD.

Next, at time t30, the drive signal SEL is turned off, and the selection transistor T17 is turned off accordingly. As a result, the pixel PX of FIG. 3 becomes non-selected.

Next, at time t31, the drive signal RST is turned off, and the reset transistor T13 is turned off accordingly.

Next, at time t32, the drive signals SEL, TGS, and FCG are turned on, and the selection transistor T17, the fourth transfer gate unit T12d, and the second transfer gate unit T12b are turned on accordingly. As a result, the pixel PX of FIG. 3 becomes selected. In addition, the potentials of the charge accumulation unit C14, the first floating diffusion region FD15a, and the second floating diffusion region FD15b are coupled, and the charges accumulated in the second photoelectric conversion unit PD11b are transferred to the coupled region. As a result, the charges accumulated in the second photoelectric conversion unit PD11b and the charge accumulation unit C14 during the exposure period are accumulated in the coupled region.

Next, at time t33, the drive signal TGS is turned off, and the fourth transfer gate unit T12d is turned off accordingly. As a result, the transfer of charges from the second photoelectric conversion unit PD11b is stopped.

Next, at time the between time t33 and time t34, a signal SL based on the potential of the region where the charge accumulation unit C14, the first floating diffusion region FD15a, and the second floating diffusion region FD15b are coupled is output to the vertical signal line VSL through the amplifier transistor T16 and the selection transistor T17. The signal SL is a signal based on the potential of the region where the charge accumulation unit C14, the first floating diffusion region FD15a, and the second floating diffusion region FD15b are coupled when the charges generated by the second photoelectric conversion unit PD11b and accumulated in the second photoelectric conversion unit PD11b and the charge accumulation unit C14 are accumulated in the coupled region. Therefore, the capacitance for charge-to-voltage conversion at the read-out of the signal SL is the combined capacitance of the charge accumulation unit C14, the first floating diffusion region FD15a, and the second floating diffusion region FD15b. This capacitance is larger than that at the read-out of the high sensitivity data signal SH1 at time tc and that at the read-out of the high sensitivity data signal SH2 at time td.

Hereinafter, the signal SL will also be referred to as the low sensitivity data signal SL.

Next, at time t34, the drive signal RST is turned on, and the reset transistor T13 is turned on accordingly. As a result, the region where the charge accumulation unit C14, the first floating diffusion region FD15a, and the second floating diffusion region FD15b are coupled is reset.

Next, at time t35, the drive signals SEL and FCG are turned off, and the selection transistor T17 and the second transfer gate unit T12b are turned off accordingly. As a result, the pixel PX of FIG. 3 becomes non-selected. In addition, the potential of the charge accumulation unit C14 is separated from the potentials of the first floating diffusion region FD15a and the second floating diffusion region FD15b.

Next, at time t36, the drive signal RST is turned off, and the reset transistor T13 is turned off accordingly.

Next, at time t37, the drive signals SEL and FCG are turned on, and the selection transistor T17 and the second transfer gate unit T12b are turned on accordingly. As a result, the pixel PX of FIG. 3 becomes selected. In addition, the potential of the charge accumulation unit C14 is coupled with the potentials of the first floating diffusion region FD15a and the second floating diffusion region FD15b.

Next, at time tf between time t37 and time t38, a signal NL based on the potential of the region where the charge accumulation unit C14, the first floating diffusion region FD15a, and the second floating diffusion region FD15b are coupled is output to the vertical signal line VSL through the amplifier transistor T16 and the selection transistor T17. This signal NL is a signal based on the reset potential of the coupling region of the charge accumulation unit C14, the first floating diffusion region FD15a, and the second floating diffusion region FD15b.

Hereinafter, the signal NL will also be referred to as the low sensitivity reset signal NL.

Next, at time t38, the drive signals SEL, FDG, and FCG are turned off, and the selection transistor T17, the conversion efficiency switching transistor T12c, and the second transfer gate unit T12b are turned off accordingly. As a result, the pixel PX of FIG. 3 becomes non-selected. In addition, the potential coupling between the charge accumulation unit C14, the first floating diffusion region FD15a, and the second floating diffusion region FD15b is eliminated.

Next, at time t39, the horizontal synchronization signal XHS is input, and the read-out period of the pixel signal of the pixel PX of FIG. 3 ends accordingly.

The ADC group 105 performs AD conversion on the pixel signal from the high dynamic range pixel PX illustrated in FIG. 3. In this case, for the read-out of one pixel signal, the ADC group 105 performs AD conversion on the high sensitivity reset signal NH2, the high sensitivity reset signals NH1 and NL, the high sensitivity data signals SH1 and SH2, the low sensitivity data signal SL, and the low sensitivity reset signal NL in order. These AD conversions need to be performed within one horizontal line period, which may prevent the frame rate from being increased. In addition, the potential of the vertical signal line that transmits pixel signals changes frequently, which may be a factor in increasing power consumption.

Therefore, the imaging device 100 according to the first embodiment and a second embodiment described below has a feature that even when the sensitivity and conversion efficiency are switched in a plurality of ways, it does not prevent the frame rate from being increased, and also does not increase the power consumption.

(Configuration of Main Units of Imaging Device 100)

Figure 6:
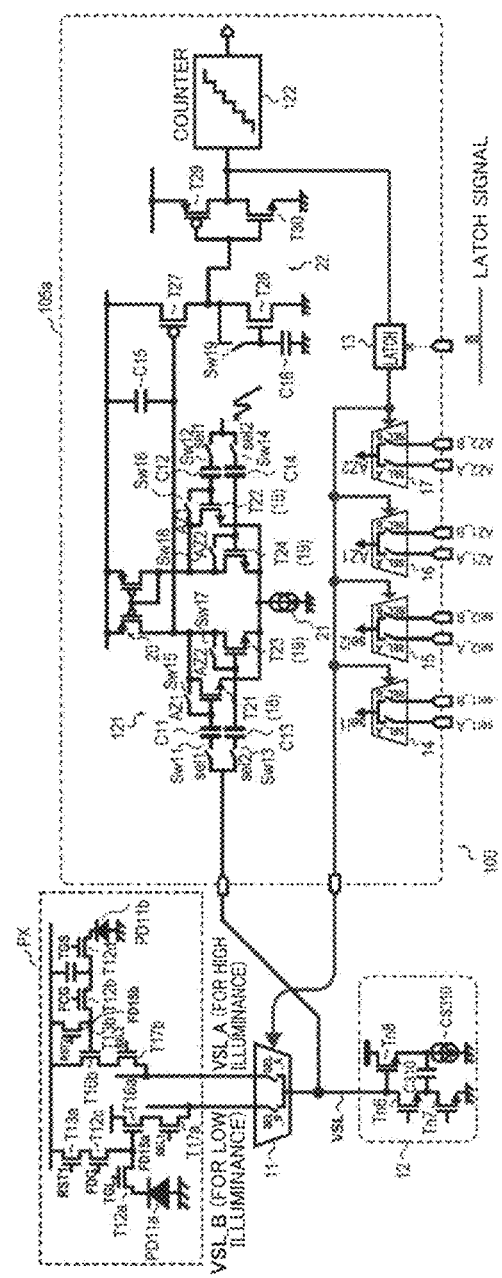
FIG. 6 is a circuit diagram of main units of the imaging device according to the first embodiment.

FIG. 6 is a circuit diagram of the main units of the imaging device 100 according to the first embodiment. Although only one pixel is illustrated in FIG. 6, a plurality of pixels are actually arranged in the row and column directions to constitute the pixel array unit of FIG. 1.

As illustrated in FIG. 6, a VSL selector (pixel signal selector) 11, a VSL boost circuit 12, and the ADC 105a are arranged for each column of pixels arranged in the column direction. The ADC 105a includes the comparator 121, the counter 122, a latch 13, and a plurality of signal selectors (first to fourth signal selectors) 14 to 17. The latch 13 is provided separately from the latch circuit 123 of FIG. 1, as will be described later.

Each pixel PX includes the first photoelectric conversion unit PD11a, the second photoelectric conversion unit PD11b, the first to fourth transfer gate units T12a to T12d, reset transistors T13a and T13b, the charge accumulation unit C14, the first floating diffusion region FD15a, the second floating diffusion region FD15b, amplifier transistors T16a and T16b, and selection transistors T17a and T17b.

The pixel PX in FIG. 6 differs from the pixel PX of FIG. 3 in that it has two vertical signal lines VSL_A and VSL_B, the two reset transistors T13a and T13b, the two amplifier transistors T16a and T16b, and the two selection transistors T17a and T17b.

VSL_B, which is one of the two vertical signal lines VSL_A and VSL_B transmits a first pixel signal corresponding to the charges photoelectrically converted by the first photoelectric conversion unit PD11a, which has a large light-receiving area, and the other VSL_A transmits a second pixel signal corresponding to the charges photoelectrically converted by the second photoelectric conversion unit PD11b, which has a small light-receiving area.

The gate of the amplifier transistor T16a is connected to the first floating diffusion region FD15a, the source of the amplifier transistor T16a is connected to the drain of the selection transistor T17a, and the source of the selection transistor T17a is connected to the vertical signal line VSL_B.

The gate of the amplifier transistor T16b is connected to the second floating diffusion region FD15b, the source of the amplifier transistor T16b is connected to the drain of the selection transistor T17b, and the source of the selection transistor T17b is connected to the vertical signal line VSL_A.

The VSL selector 11 selects either the first pixel signal or the second pixel signal on the two vertical signal lines VSL_B and VSL_A, and outputs the selected signal to the vertical signal line VSL. The VSL selector 11 selects the first pixel signal or the second pixel signal based on an output signal of the latch 13 that holds the output signal of the comparator 121 in the ADC 105a.

For example, the VSL selector 11 selects the first pixel signal on the vertical signal line VSL_B when the output signal of the latch 13 is at a high level, and selects the second pixel signal on the vertical signal line VSL_A when the output signal of the latch 13 is at a low level. As will be described later, the output signal of the latch 13 becomes a high level when the illuminance at the start of imaging is less than a reference level, and the output signal of the latch 13 becomes a low level when the illuminance at the start of imaging is equal to or greater than the reference level. In the present embodiment, when the illuminance is equal to or greater than the reference level, AD conversion is performed a plurality of times with low sensitivity, and when the illuminance is less than the reference level, AD conversion is performed a plurality of times with high sensitivity while switching the charge-voltage conversion efficiency.

In this specification, the amplifier transistor T16a, the selection transistor T17a, and others, for outputting the first pixel signal to the vertical signal line VSL_B are collectively referred to as a first read-out circuit, and the amplifier transistor T16b, the selection transistor T17b, and others, for outputting the second pixel signal to the vertical signal line VSL_A are collectively referred to as a second read-out circuit.

The pixel signal selected by the VSL selector 11 is input to the ADC 105a through the vertical signal line VSL. The VSL boost circuit 12 is connected to the vertical signal line VSL. The VSL boost circuit 12 is provided to quickly stabilize the potential of the vertical signal line VSL.

The VSL boost circuit 12 includes n-type transistors Tn6 to Tn8, a capacitor C310, and a constant current source CS310. The gate of the transistor Tn8 is connected to the vertical signal line VSL. The drain of the transistor Tn8 is connected to the power supply VDD, and the source thereof is connected to the constant current source CS310. As a result, the transistor Tn8 and the constant current source CS310 function as a source follower whose gain is smaller than "1".

One end of the capacitor C310 is connected to the gate of the transistor Tn8 through the transistor Tn6. The other end of the capacitor C310 is connected to the source of transistor Tn8. As a result, a same polarity signal obtained by dividing the pixel signal of the vertical signal line VSL by the gain of the transistor Tn6 appears at the source of the transistor Tn6, and a signal obtained by multiplying a fluctuation of the pixel signal of the vertical signal line VSL by the gain of the source follower appears on the source of the transistor Tn8 side. As a result, it appears that a relatively large same polarity gain is applied to the source side of the transistor Tn8 at both ends of the capacitor C310, as compared to the source side of the transistor Tn6. Consequently, the VSL boost circuit 12 operates as a negative capacitance circuit.

The transistor Tn7 is connected between one end of the capacitor C310 and the ground GND. The transistor Tn6 is connected between one end of the capacitor C310 and the vertical signal line VSL. The transistor Tn7 functions as a constant current source for the vertical signal line VSL.

A parasitic capacitor appears in the vertical signal line VSL. It is now assumed that a voltage of +Vs is applied to the parasitic capacitor of the vertical signal line VSL. In this case, in the negative capacitance circuit 310, when the gain of the transistor Tn8 and the constant current source CS310, which function as a source follower, is "0.9", and when the gain from the source to the drain of the transistor Tn6 is "10", 0.1×Vs is applied to the terminal of the capacitor C310 on the vertical signal line VSL side, and 0.9×Vs is applied to the terminal on the opposite side. Therefore, with reference to the potential (0.9×Vs) on the opposite side to the vertical signal line VSL, a voltage of −0.8×Vs is applied to the capacitor C310. As a result, +Vs is applied to the parasitic capacitor of the vertical signal line VSL, and −0.8×Vs is applied to the capacitor C310, and thus the line capacitance of the vertical signal line VSL is reduced compared to the case of no negative capacitance circuit 310.

The VSL boost circuit 12 being provided makes it possible to quickly stabilize the potential of the vertical signal line VSL, and thus shorten the settling time.

Although the transistor Tn8 and the constant current source Cs310, which function as a source follower, are used in the present disclosure, other configurations that can perform non-inverting amplification may also be used as long as they can sufficiently reduce the influence of the parasitic capacitor of the vertical signal line 110.

The comparator 121 in the ADC 105a includes a first differential transistor pair 18, a second differential transistor pair 19, first to eighth switches Sw11 to Sw18, first to fourth capacitors C11 to C14, a current mirror circuit 20, a current source 21, a capacitor C15, and an output circuit 22.

The first differential transistor pairs 18 and 19 alternately compare the pixel signal selected by the VSL selector 11 with a reference signal when the illuminance is determined to be less than the reference level. The reference signal is, for example, a ramp wave signal whose voltage level changes continuously over time, and is generated by the DAC 104 in FIG. 1. The pixel signal selected by the VSL selector 11 and the reference signal are alternately input to either one of the first differential transistor pairs 18 and 19 to perform a comparison operation.

The second differential transistor pair 19 compares the pixel signal selected by the VSL selector 11 with the reference signal at the start of imaging and when the illuminance at the start of imaging is determined to be equal to or greater than the reference level.

In this way, the first differential transistor pairs 18 and 19 alternately perform a comparison operation on the pixel signal selected by the VSL selector 11 and the reference signal when the illuminance is determined to be less than the reference level.

The first differential transistor pair 18 includes a first transistor T21 and a second transistor T22. The second differential transistor pair 19 includes a third transistor T23 and a fourth transistor T24. The first to fourth transistors T21 to T24 are NMOS transistors.

The first switch Sw11 and the first capacitor C11 are connected in series between the gate of the first transistor T21 and the vertical signal line VSL. The second switch Sw12 and the second capacitor C12 are connected in series between the gate of the second transistor T22 and an input node for the reference signal. The input node for the reference signal is equivalent to the output node of the DAC 104 in FIG. 1.

The third switch Sw13 and the third capacitor C13 are connected in series between the gate of the third transistor T23 and the vertical signal line VSL. The fourth switch Sw14 and the fourth capacitor C14 are connected in series between the gate of the fourth transistor T24 and the input node for the reference signal.

The fifth switch Sw15 is connected between the gate and drain of the first transistor T21 to switch whether or not to short-circuit the gate and drain of the first transistor T21. The sixth switch Sw16 is connected between the gate and drain of the second transistor T22 to switch whether or not to short-circuit the gate and drain of the second transistor T22.

The seventh switch Sw17 is connected between the gate and drain of the third transistor T23 to switch whether or not to short-circuit the gate and drain of the third transistor T23. The eighth switch Sw18 is connected between the gate and drain of the fourth transistor T24 to switch whether or not to short-circuit the gate and drain of the fourth transistor T24.

Signals sel1_A, sel1_B, sel2_A, sel2_B, AZ1_A, AZ1_B, AZ2_A, and AZ2_B input to the first to fourth signal selectors 14 to 17 are signals common to all columns.

The first signal selector 14 generates a signal sel1 based on the output signal of the latch 13 to turn on or off the first switch Sw11 and the second switch Sw12. The first signal selector 14 sets the signal sel1 to sel1_A when the output signal of the latch 13 is at a low level. sel1_A is a low level signal. Thus, when the output signal of the latch 13 is at a low level, both the first switch Sw11 and the second switch Sw12 are turned off. The first signal selector 14 sets the signal sel1 to sel1_B when the output signal of the latch 13 is at a high level. sel1_B is a signal that alternately repeats a high level and a low level. Thus, the first switch Sw11 and the second switch Sw12 are alternately turned on and off.

The second signal selector 15 generates a signal sel2 based on the output signal of the latch 13 to turn on or off the third switch Sw13 and the fourth switch Sw14. The second signal selector 15 sets the signal sel2 to sel2_A when the output signal of the latch 13 is at a low level. sel2_A is a high level signal. Thus, when the output signal of the latch 13 is at a low level, both the third switch Sw13 and the fourth switch Sw14 are turned on, accordingly, one end of the third capacitor C13 is connected to the vertical signal line VSL, and one end of the fourth capacitor C14 is connected to the input node for the reference signal. The second signal selector 15 sets the signal sel2 to sel2_B when the output signal of the latch 13 is at a high level. sel2_B is a signal that alternately repeats a high level and a low level. Thus, the third switch Sw13 and the fourth switch Sw14 are alternately turned on and off.

The third signal selector 16 generates a signal AZ1 based on the output signal of the latch 13 to turn on or off the fifth switch Sw15 and the sixth switch Sw16. The third signal selector 16 sets the signal AZ1 to AZ1_A when the output signal of the latch 13 is at a low level. AZ1_A is a low level signal. Thus, when the output signal of the latch 13 is at a low level, both the fifth switch Sw15 and the sixth switch Sw16 are turned off. The third signal selector 16 sets the signal AZ1 to AZ1_B when the output signal of the latch 13 is at a high level. AZ1_B is a pulse signal output once within one horizontal line period. When AZ1_B is an output of pulse signal, the fifth switch Sw15 and the sixth switch Sw16 are turned on.

The fourth signal selector 17 generates a signal AZ2 based on the output signal of the latch 13 to turn on or off the seventh switch Sw17 and the eighth switch Sw18. The fourth signal selector 17 sets the signal AZ2 to AZ2_A when the output signal of the latch 13 is at a low level. AZ2_A is a pulse signal output twice within one horizontal line period. When AZ2_A is an output of pulse signal, the seventh switch Sw17 and the eighth switch Sw18 are turned on. The fourth signal selector 17 sets the signal AZ2 to AZ2_B when the output signal of the latch 13 is at a high level. AZ2_B is a pulse signal output twice within one horizontal line period. When AZ2_B is an output of pulse signal, the seventh switch Sw17 and the eighth switch Sw18 are turned on.

The output circuit 22 in the comparator 121 includes seventh to tenth transistors T27 to T30, a switch Sw19, and a capacitor C16. The seventh transistor T27 and the ninth transistor T29 are PMOS transistors, and the eighth transistor T28 and the tenth transistor T30 are NMOS transistors.

The seventh transistor T27 and the eighth transistor T28 are connected in cascode between the power supply node and the ground node. The gate of the seventh transistor T27 is connected to the drains of the first and third transistors T21 and T23. The capacitor C15 is connected between the gate of the seventh transistor T27 and the power supply node. The switch Sw19 is connected between the drain and gate of the eighth transistor T28. The capacitor C16 is connected between the gate of the eighth transistor T28 and the ground node.

The ninth transistor T29 and the tenth transistor T30 form an inverter, which inverts the logic of a connection node between the seventh transistor T27 and the eighth transistor T28 and outputs the resulting logic. The output signal of this inverter is input to the counter 122 and to the latch 13. The latch 13 holds the output signal of the inverter at a predetermined timing.

The imaging device 100 of FIG. 6 measures illuminance using the first photoelectric conversion unit PD11b at the start of imaging, and when the measured illuminance is, for example, equal to or greater than a reference level, performs AD conversion a plurality of times with low sensitivity, and when the measured illuminance is less than the reference level, performs AD conversion a plurality of times with high sensitivity while switching the charge-voltage conversion efficiency. The reference level may be, for example, an illuminance near the center of a variable range of illuminance, or an illuminance other than that.

Figure 7:
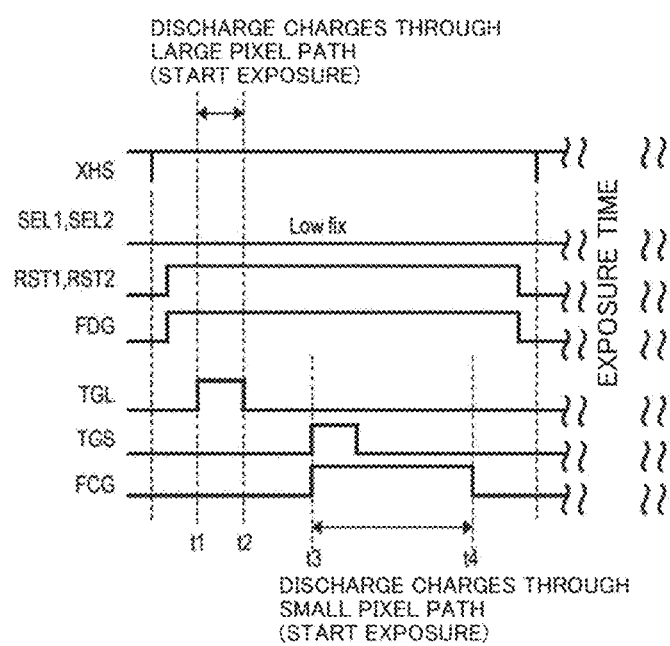
FIG. 7 illustrates discharge periods and exposure start timings of a first photoelectric conversion unit and a second photoelectric conversion unit.

In the present embodiment, the first photoelectric conversion unit PD11a, which has a small light-receiving area, is used to measure the illuminance at the start of imaging. FIG. 7 illustrates discharge periods and exposure start timings of the first photoelectric conversion unit PD11a and the second photoelectric conversion unit PD11b. The first floating diffusion region FD15a that accumulates charges from the first photoelectric conversion unit PD11a, which has a large light-receiving area, discharges the charges during a period when the drive signal TGL is high (time t1 to t2), and then exposure starts. On the other hand, the second floating diffusion region FD15b that accumulates charges from the second photoelectric conversion unit PD11b, which has a small light-receiving area, discharges the charges during a period when the drive signal TGS is high (time t3 to t4), and then exposure starts. The exposure starts in the first photoelectric conversion unit PD11a prior to the second photoelectric conversion unit PD11b. However, the first photoelectric conversion unit PD11a is easily saturated with photoelectrically converted charges, so that there is a possibility that the illuminance cannot be measured accurately.

Figure 8:
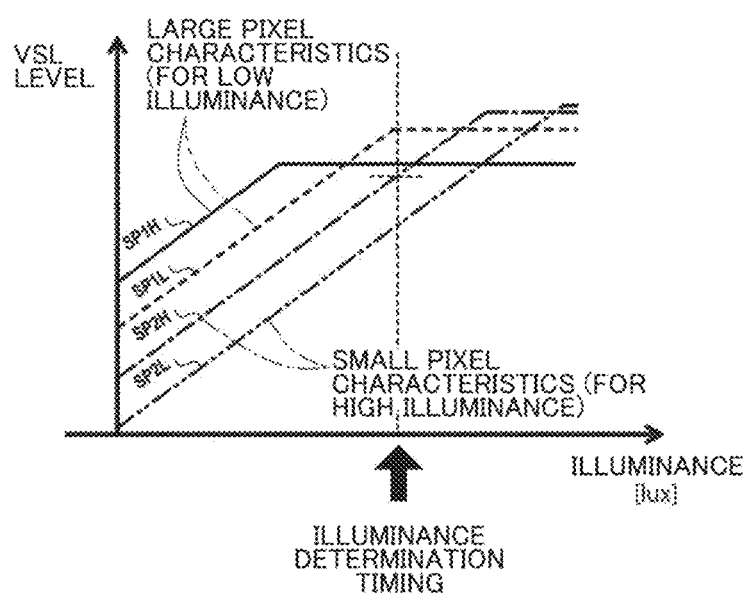
FIG. 8 illustrates a relationship between the illuminance and the potential level of a vertical signal line.

FIG. 8 illustrates a relationship between the illuminance and the potential level of the vertical signal line. FIG. 8 illustrates cases where photoelectric conversion and AD conversion are performed with high sensitivity and high conversion efficiency (hereinafter sometimes referred to as SP1H), high sensitivity and low conversion efficiency (hereinafter sometimes referred to as SP1L), low sensitivity and no capacitance (hereinafter referred to as SP2H), and low sensitivity and a capacitance (hereinafter referred to as SP2L). As illustrated, for SP1H and SP1L using the first photoelectric conversion unit PD11a, which has a large light-receiving area, the potential of the vertical signal line is saturated even if the illuminance is not so high. On the other hand, for SP2H and SP2L using the second photoelectric conversion unit PD11b, which has a small light-receiving area, the potential of the vertical signal line is not saturated even if the illuminance is high.

As can be seen from FIG. 8, by using the second photoelectric conversion unit PD11b, which has a small light-receiving area, there is less possibility that the potential will be saturated, and the illuminance can be determined with higher accuracy. Therefore, in the present embodiment, before starting imaging of each pixel PX, it is determined whether or not the illuminance is equal to or greater than the reference level by using the second photoelectric conversion unit PD11b. When the illuminance is equal to or greater than the reference level, the second photoelectric conversion unit PD11b is continuously used to perform AD conversion a plurality of times with low sensitivity, and when the illuminance is less than the reference level, the first photoelectric conversion unit PD11a is used to perform AD conversion a plurality of times while switching the conversion efficiency with high sensitivity.

Figure 9:
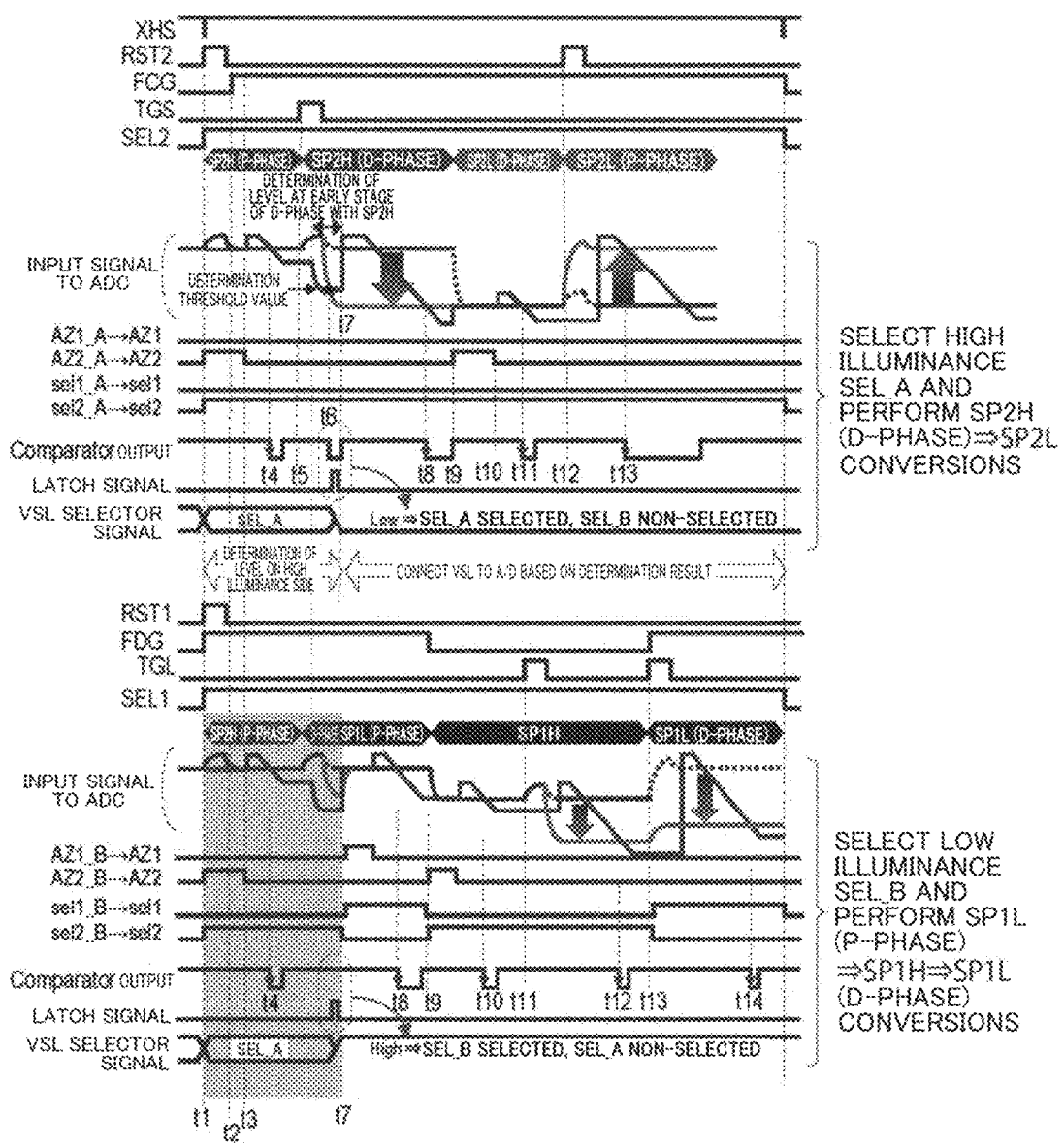
FIG. 9 is a timing diagram of the imaging device according to the first embodiment.

FIG. 9 is a timing diagram of the imaging device 100 according to the first embodiment. As described above, at the start of imaging, the illuminance is measured using the second photoelectric conversion unit PD11b, and when the illuminance is equal to or greater than the reference level (hereinafter referred to as high illuminance), AD conversion processing is performed a plurality of times in the order of SP2H (data acquisition period), SP2L (data acquisition period), and SP2L (reset period) within one horizontal line period. When the illuminance is less than the reference level (hereinafter referred to as low illuminance), AD conversion processing is performed a plurality of times in the order of SP1L (reset period), SP1H (reset period, data acquisition period), and SP1L (data acquisition period) within one horizontal line period. The upper half of FIG. 9 illustrates a timing diagram for the high illuminance as determined, and the lower half illustrates a timing diagram for the low illuminance as determined. In the drawings attached to this specification, SP2H (data acquisition period) is represented as SP2H (D-phase), SP2L (data acquisition period) is represented as SP2L (D-phase), and SP2L (reset period) is represented as SP2L (P-phase), SP1L (reset period) is represented as SP1L (P-phase), SP1H (reset period, data acquisition period) is represented as SP1H, and SP1L (data acquisition period) is represented as SP1L (D-phase).

In this specification, SP2H (reset period) is referred to as first comparison processing, SP2H (data acquisition period) is referred to as second comparison processing, SP2L (data acquisition period) is referred to as third comparison processing, SP2L (reset period) is referred to as fourth comparison processing, SP1L (reset period) is referred to as fifth comparison processing, SP1H (reset period) is referred to as sixth comparison processing, SP1H (data acquisition period) is referred to as seventh comparison processing, and SP1L (data acquisition period) is referred to as eighth comparison processing.

First, at time t1, the reset transistor T13 is turned on, and the charges in the second floating diffusion region FD15b are discharged to the power supply node accordingly. After time t2, the second photoelectric conversion unit PD12b starts photoelectric conversion. However, since the transfer transistor T12d is not turned on until time t5, the second floating diffusion region FD15b holds the reset potential until time t5. In the initial state of starting imaging, the VSL selector 11 is set to select the second pixel signal on the vertical signal line VSL_A.

After time t1, the third switch Sw13 and the fourth switch Sw14 are turned on. During a period of time t1 to time t3, the seventh switch Sw17 and the eighth switch Sw18 are turned on, accordingly, the gate and drain of the third transistor T23 are short-circuited, and the gate and drain of the fourth transistor T24 are short-circuited, so that an auto-zero operation is performed to discharge the accumulated charges in the third capacitor C13 and the fourth capacitor C14.

At time t4, the second pixel signal corresponding to the potential of the second floating diffusion region FD15b crosses the reference signal. As a result, the output signal of the comparator 121 transitions to a low level. The counter 122 counts the time until the output signal of the comparator 121 transitions to a low level. The count value of the counter 122 represents the reset level of SP2H.

Thereafter, when the transfer transistor T12d is turned on at time t5, the charges photoelectrically converted by the second photoelectric conversion unit PD11b are accumulated in the second floating diffusion region FD15b through the transfer transistor T12d. Thus, the signal level of the second pixel signal on the vertical signal line VSL_A begins to decrease. At time t5, the VSL selector 11 has selected the second pixel signal, and the second pixel signal is input to the comparator 121.

At time t6, when the second pixel signal crosses the reference signal, the output signal of the comparator 121 transitions to a low level. When the output signal of the comparator 121 transitions to a low level at time t6, the latch 13 holds the output signal of the comparator 121. The output of the comparator 121 transitions to a low level at time t6 when the second pixel signal becomes less than the reference signal, indicating high illuminance.

In this way, the illuminance can be determined based on whether or not the second pixel signal corresponding to the charges photoelectrically converted by the second photoelectric conversion unit PD11b crosses the reference signal. When the second pixel signal crosses the reference signal, it is determined that the illuminance is high, and when the second pixel signal does not cross the reference signal, it is determined that the illuminance is low.

At time t6, when the second pixel signal crosses the reference signal, the held signal of the latch 13 becomes a low level. Since the held signal of the latch 13 is at a low level even in the initial state, the selection target of the VSL selector 11 does not change, and the selection targets of the first to fourth signal selectors 14 to 17 also do not change. Specifically, the VSL selector 11 continues to select the vertical signal line VSL_B. In addition, the first signal selector 14 selects sel1_A as the signal sel1, the second signal selector 15 selects sel2_A as the signal sel2, the third signal selector 16 selects AZ1_A as the signal sel3, and the fourth signal selector 17 selects AZ2_A as the signal sel4.

During a period of time t7 to time t9, AD conversion operation for the SP2H data acquisition period is performed. At time t8, when the second pixel signal crosses the reference signal, the output of the comparator 121 transitions to a low level. Accordingly, the count value of the counter 122 until the output of the comparator 121 transitions to a low level indicates an SP2H data (pixel signal) level.

When the signal AZ2 of the fourth signal selector 17 becomes a high level at time t9, the seventh switch Sw17 and the eighth switch Sw18 are turned on, and the charges accumulated in the third capacitor C13 and the fourth capacitor C14 are discharged accordingly. Thereafter, when the second pixel signal crosses the reference signal at time t11, the output signal of the comparator 121 transitions to a low level, and accordingly, the count value counted by the counter 122 until the output signal of the comparator 121 transitions to a low level indicates an SP2L data (pixel signal) level.

Thereafter, at time t12, the drive signal RST2 is input to the gate of the reset transistor T13, and the reset transistor T13 is turned on accordingly. As a result, the accumulated charges in the second floating diffusion region FD15b are discharged to the power supply node. Thereafter, when the second pixel signal crosses the reference signal at time t13, the output signal of the comparator 121 transitions to a low level, and accordingly, the count value counted by the counter 122 until the output signal of the comparator 121 transitions to a low level indicates an SP2L reset level.

On the other hand, if the illuminance is determined to be less than the reference level, the operation indicated in the timing diagram in the lower half of FIG. 9 is performed. The timing from time t1 to time t7 in the timing diagram in the lower half of FIG. 9 is the same as those in the timing diagram in the upper half, and illuminance determination using the second photoelectric conversion unit PD11b is performed. After time t8, exposure processing using the first photoelectric conversion unit PD11b is performed.

Even at time t7, when the second pixel signal does not cross the reference signal, it is determined that the illuminance is less than the reference level, the VSL selector 11 selects the vertical signal line VSL_B, the second signal selector 15 selects sel2_B as the signal sel2, the third signal selector 16 selects AZ1_B as the signal sel3, and the fourth signal selector 17 selects AZ2_B as the signal sel4.

After time t7, the first pixel signal corresponding to the potential of the first floating diffusion region FD15a is selected by the VSL selector 11, and input to the comparator 121. When the first pixel signal crosses the reference signal at time t8, the output signal of the comparator 121 transitions to a low level, and accordingly, the count value counted by the counter 122 until the output signal of the comparator 121 transitions to a low level indicates an SP1L reset level.

At time t9, the signal FDG transitions to a low level, and the charge-voltage conversion efficiency becomes high until time t12. When the transfer transistor T12a is turned on at time t11, the charges photoelectrically converted by the first photoelectric conversion unit PD11a are accumulated in the first floating diffusion region FD15a through the transfer transistor T12a, and the first pixel signal begins to decrease accordingly. When the first pixel signal crosses the reference signal at time t12, the output signal of the comparator 121 transitions to a low level, and accordingly, the count value counted by the counter 122 until the output signal of the comparator 121 transitions to a low level indicates an SP1H data (pixel signal) level.

Thereafter, at time t13, the signal FDG transitions to a high level, and after time t13, the charge-voltage conversion efficiency is reduced. In addition, at time t13, the transfer transistor T12a is turned on, and the charges photoelectrically converted by the first photoelectric conversion unit PD11a are accumulated in the first floating diffusion region FD15a through the transfer transistor T12a accordingly. As a result, the signal level of the first pixel signal input from the VSL selector 11 to the comparator 121 changes. At time 14, when the first pixel signal crosses the reference signal, the output signal of the comparator 121 transitions to a low level, and accordingly, the count value counted by the counter 122 until the output signal of the comparator 121 transitions to a low level indicates an SP1L data (pixel signal) level.

In FIG. 6, provided separately are a circuit block that includes the transfer transistor T12a connected to the first photoelectric conversion unit PD11a in the pixel PX, the conversion efficiency switching transistor T12c, the reset transistor T13a, the amplifier transistor T16a, the selection transistor T17a, and the vertical signal line VSL_B; and a circuit block that includes the transfer transistor T12d connected to the second photoelectric conversion unit PD11b, the transfer transistor T12b, the reset transistor T13b, the amplifier transistor T16b, the selection transistor T17b, and the vertical signal line VSL_A. Signals are not transmitted and received between these circuit blocks.

Figure 10:
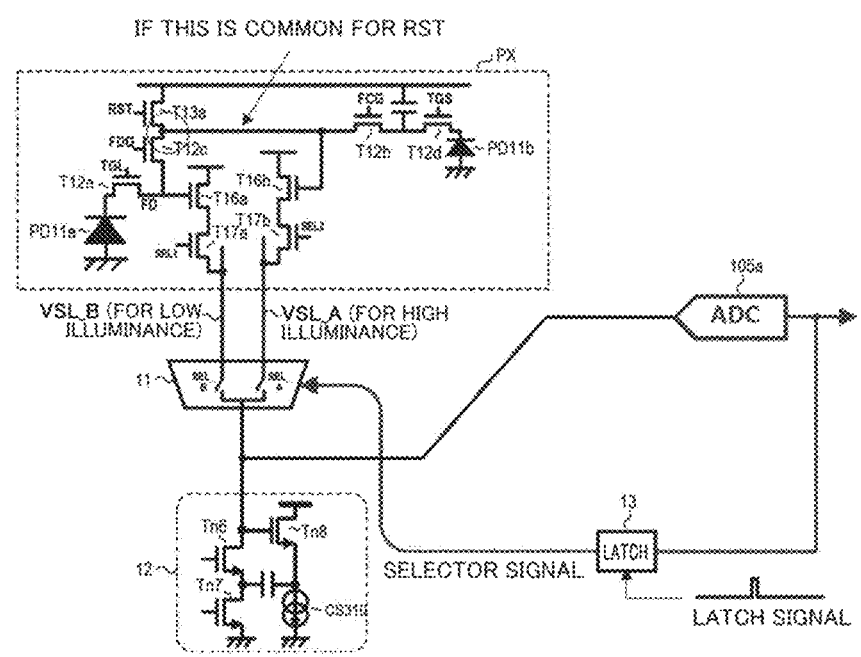
FIG. 10 is a circuit diagram of a pixel PX that is a comparative example in which a reset transistor is shared between two circuit blocks.

In contrast, FIG. 10 is a circuit diagram of a pixel PX according to a comparative example in which the reset transistor T13a is shared by two circuit blocks.

Figure 11:
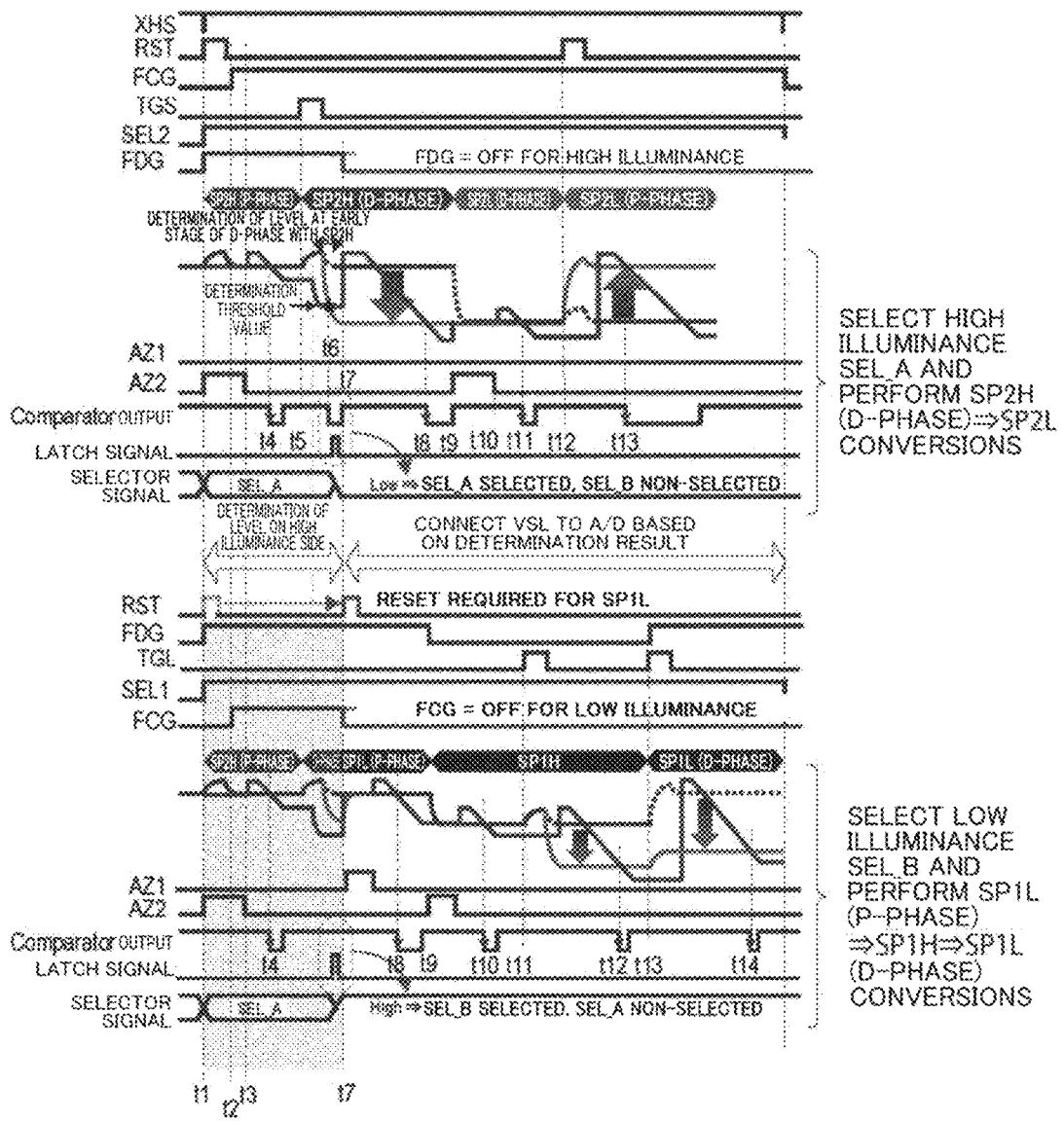
FIG. 11 is a timing diagram of FIG. 10.

FIG. 11 is a timing diagram of FIG. 10. When the illuminance is equal to or greater than the reference level, AD conversion processing using the second photoelectric conversion unit PD11b is performed. However, as illustrated in FIG. 11, it is necessary to reduce the signal FDG, which is unrelated to the operation on the low sensitivity side, to a low level at time t7. When the illuminance is less than the reference level, it is necessary to turn on the reset transistor T13a, which is shared by the two circuit blocks, at time t7. In addition, when the illuminance is less than the reference level, it is necessary to turn off the originally unrelated transfer transistor T12c at time t7.

Sharing one signal path by the two circuit blocks in the pixel PX in this way requires feedback of an illuminance determination result to a pixel control signal. In order to avoid this, it is desirable to provide two independent circuit blocks within the pixel PX, as illustrated in FIG. 6.

In this way, the imaging device 100 according to the first embodiment determines whether or not the illuminance at the second photoelectric conversion unit PD11b, which has a small light-receiving area, is equal to or greater than the reference level, and if it is determined that the illuminance is equal to or greater than the reference level, AD conversions with low sensitivity are performed a plurality of times in order (AD conversions for the SP2H data (pixel signal) level, the SP2L data (pixel signal) level, and the SP2L reset level), and if it is determined that the illuminance is less than the reference level, AD conversions with high sensitivity are performed a plurality of times in order (AD conversions for the SP1L reset level, the SP1H and SP1L data (pixel signal) level) while switching the charge-voltage conversion efficiency. In the present embodiment, only the AD conversion processing according to the measured illuminance is performed, so that the frame rate can be increased, and the signals on the vertical signal line do not have to be switched frequently, so that power consumption can be reduced.

Further, the ADC 105a according to the first embodiment includes the comparator 121 including the first differential transistor pair 18 and the second differential transistor pair 19. Since the first differential transistor pair 18 and the second differential transistor pair 19 are switched to be used for the comparison operation according to an illuminance determination result, it is possible to quickly switch between the two types of comparison operations without wasting time.

Second Embodiment

In a second embodiment, a sample-and-hold circuit is provided at the previous stage of the ADC 105a to hold a plurality of pixel signals with different sensitivities and conversion efficiencies in parallel, and the pixel signals held in the sample-and-hold circuit are switched according to an illuminance determination result.

Figure 12:
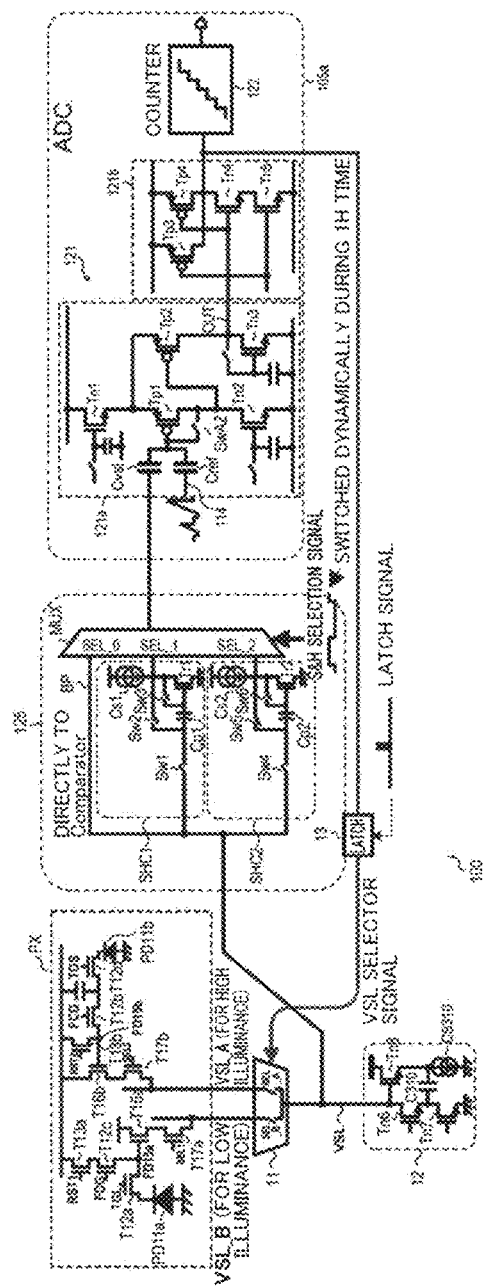
FIG. 12 is a circuit diagram illustrating a configuration of main units of an imaging device according to a second embodiment.

FIG. 12 is a circuit diagram illustrating a configuration of main units of an imaging device 100 according to the second embodiment. The imaging device 100 of FIG. 12 includes a sample-and-hold circuit (SH) 125 between the vertical signal line VSL output from the VSL selector 11 and the ADC 105a. The VSL boost circuit 12 is connected to the vertical signal line VSL. The internal configuration of the VSL boost circuit 12 is the same as that of the VSL boost circuit 12 in FIG. 6, and thus the detailed description thereof will be omitted.

The sample-and-hold circuit 125 includes a first hold circuit SHC1, a second hold circuit SHC2, a bypass signal line BP, and a multiplexer (sample-and-hold selector) MUX. The vertical signal line VSL output from the VSL selector 11 is connected to the input nodes of the first hold circuit SHC1 and the second hold circuit SHC2, and is also directly connected to the bypass signal line BP.

(Configuration and Function of First Hold Circuit SHC1)

The first hold circuit SHC1 is configured to sample and hold the pixel signal selected by the VSL selector 11. The first hold circuit SHC1 includes a capacitor Cp1, a transistor Tr1, switches Sw1 to Sw3, and a constant current source Cs1.

One end of the capacitor Cp1 is connected to the vertical signal line VSL through the switch Sw1 to accumulate a pixel signal. The other end of the capacitor Cp1 is connected to the gate of the transistor Tr1.

The gate of the transistor Tr1 is connected to the other end of the capacitor Cp1. The drain of the transistor Tr1 is connected to the constant current source Cs1 and the multiplexer MUX, and the source thereof is connected to the ground (reference voltage source) GND. The constant current source Cs1 is connected between the power supply VDD and the drain of the transistor Tr1 to cause a constant current to flow through the drain of the transistor Tr1. The transistor Tr1 causes a current depending on the potential of the gate to flow between the drain and the source. As a result, the drain of the transistor Tr1 has a potential corresponding to the potential of the gate of the transistor Tr1. The drain of the transistor Tr1 is connected to the multiplexer MUX, and the drain voltage of the transistor Tr1 is output as an output signal of the first hold circuit SHC1.

The switch Sw1 is connected between the capacitor Cp1 and the vertical signal line VSL. The switch Sw2 is connected between the drain of the transistor Tr1 and one end of the capacitor Cp1. The switch Sw3 is connected between the drain of the transistor Tr1 and the other end of the capacitor Cp1.

When the first hold circuit SHC1 samples the pixel signal selected by the VSL selector 11 at the capacitor Cp1, the switches Sw1 and Sw3 are turned on (becomes conductive). Meanwhile, the switch Sw2 is off (becomes non-conductive). As a result, the pixel signal is transmitted to one end of the capacitor Cp1, and accordingly, the capacitor node on the opposite side of the gate of the transistor Tr1 is set to a potential corresponding to the pixel signal. On the other hand, when the capacitor Cp1 holds the pixel signal, the switches Sw1 and Sw3 are turned off and the switch Sw2 is turned on. As a result, the pixel signal accumulated in the capacitor Cp1 is held. Meanwhile, the transistor Tr1 becomes conductive (analog state) according to the pixel signal, and the drain of the transistor Tr1 is maintained at a potential corresponding to the pixel signal. Thus, the first hold circuit SHC1 outputs an output signal corresponding to the pixel signal from the drain of the transistor Tr1 to the multiplexer MUX.

(Configuration and Function of Second Hold Circuit SHC2)

As with the first hold circuit SHC1, the second hold circuit SHC2 is provided between the pixel array unit 101 and the comparator 121, and is configured to sample and hold a pixel signal. The second hold circuit SHC2 includes a capacitor Cp2, a transistor Tr2, switches Sw4 to Sw6, and a constant current source Cs2. The second hold circuit SHC2 samples a pixel signal from the same vertical signal line VSL as the first hold circuit SHC1 at different timings. Therefore, the first and second hold circuits SHC1 and SHC2 can sample and hold a plurality of pixel signals with different sensitivities or conversion efficiencies from the same pixel PX.

One end of the capacitor Cp2 is connected to the vertical signal line VSL through the switch Sw4 to accumulate a pixel signal. The other end of the capacitor Cp2 is connected to the gate of the transistor Tr2.

The gate of the transistor Tr2 is connected to the other end of the capacitor Cp2. The drain of the transistor Tr2 is connected to the constant current source Cs2 and the multiplexer MUX, and the source thereof is connected to the ground (reference voltage source) GND. The constant current source Cs2 is connected between the power supply VDD and the drain of the transistor Tr2 to cause a constant current to flow through the drain of the transistor Tr2. The transistor Tr2 causes a current depending on the potential of the gate to flow between the drain and the source. As a result, the drain of the transistor Tr2 has a potential corresponding to the potential of the gate of the transistor Tr2. The drain of the transistor Tr2 is connected to the multiplexer MUX, and the drain voltage of the transistor Tr2 is output as an output signal of the second hold circuit SHC2.

The switch Sw4 is connected between the capacitor Cp2 and the vertical signal line VSL. The switch Sw5 is connected between the drain of the transistor Tr2 and one end of the capacitor Cp2. The switch Sw6 is connected between the drain of the transistor Tr2 and the other end of the capacitor Cp2.

When the second hold circuit SHC2 samples the pixel signal selected by the VSL selector 11 at the capacitor Cp2, the switches Sw4 and Sw6 are turned on. Meanwhile, the switch Sw5 is off. As a result, the pixel signal is transmitted to one end of the capacitor Cp2, and accordingly, the capacitor node on the opposite side of the gate of the transistor Tr2 is set to a potential corresponding to the pixel signal. On the other hand, when the capacitor Cp2 holds the pixel signal, the switches Sw4 and Sw6 are turned off and the switch Sw5 is turned on. As a result, the pixel signal accumulated in the capacitor Cp2 is held. Meanwhile, the gate of the transistor Tr2 becomes conductive (analog state) according to the pixel signal, and the drain of the transistor Tr2 is maintained at a potential corresponding to the pixel signal. Thus, the second hold circuit SHC2 outputs an output signal corresponding to the pixel signal to the multiplexer MUX.

In this way, the first and second hold circuits SHC1 and SHC2 are each configured as an active element. As a result, the first and second hold circuits SHC1 and SHC2 are resistant to fluctuations in the voltages of the ground GND and the power supply VDD, and can cancel variations in characteristics of the transistors Tr1 and Tr2.

(Configuration and Function of Bypass Signal Line BP)

The bypass signal line BP is provided between the vertical signal line VSL and the comparator 121 of the ADC group 105, and transmits the pixel signal selected by the VSL selector 11 as it is through the multiplexer MUX. The bypass signal line BP directly outputs an output signal OUTbp through the multiplexer MUX without holding the pixel signal in a capacitor or the like. Thus, noise caused by the capacitors Cp1 and Cp2 and the transistors Tr1 and Tr2 does not appear on the pixel signal. In other words, the bypass signal line BP can be used in the case where signal deterioration components caused by the hold circuits SHC1 and SHC2 cannot be allowed, for example, in the case where it is desired to minimize noise near the dark signal with high conversion efficiency.

(Multiplexer MUX)

The multiplexer MUX is connected between the comparator 121 and the first and second hold circuits SHC1 and SHC2 and bypass signal line BP. The multiplexer MUX can selectively connect one of the first hold circuit SHC1, the second hold circuit SHC2, and the bypass signal line BP to the comparator 121 of the ADC group 105. As a result, the multiplexer MUX can selectively transmit to the comparator 121 the pixel signal held in the first hold circuit SHC1, the pixel signal held in the second hold circuit SHC2, or the pixel signal transmitted through the bypass signal line BP. The multiplexer MUX selects based on the selection signal SEL2 the hold circuit SHC1, the hold circuit SHC2, or the bypass signal line BP to be connected to the comparator 121. The selection signal SEL2 is received from the vertical scanning circuit 103. The selection signal SEL2 can be set to select the hold circuit SHC1, the hold circuit SHC2, or the bypass signal line BP according to the control signals TGL, TGS, FDG, FCG, and SEL of the pixel PX. The multiplexer MUX can be constituted by any switch circuit capable of performing the above operations.

(Configuration and Function of Comparator 121)

The comparator 121 includes an input comparison circuit 121a and an output circuit 121b.

The input comparison circuit 121a includes p-type transistors Tp1 and Tp2, n-type transistors Tn1 to Tn3, capacitors Cvsl and Cref, and an AZ switch SwAZ.

One ends of the capacitors Cvsl and Cref are connected to the output of the sample-and-hold circuit 125 and the reference signal line 114, respectively. The other ends of the capacitors Cvsl and Cref are commonly connected to the gate of the transistor Tp1.

The transistors Tn1, Tp1, and Tn2 are connected in series in this order between the power supply VDD and the ground GND.

The drain of the transistor Tn1 is connected to the power supply VDD, and the source thereof is connected to the source of the transistor Tp1. The transistor Tn1 functions as a low dropout (LDO) linear regulator.

As described above, the gate of the transistor Tp1 is commonly connected to the other ends of the capacitors Cvsl and Cref. The source of the transistor Tp1 is connected to the source of the transistor Tn1, and the drain of the transistor Tp1 is connected to the drain of the transistor Tn2 and the gate of the transistor Tp2. When a signal in which the output signal from the multiplexer MUX of the sample-and-hold circuit 125 and the reference signal RAMP from the DAC 104 are added exceeds a threshold voltage, the transistor Tp1 changes from conductive to non-conductive, and inverts the voltage level of the gate of the transistor Tp2 from a high level to a low level accordingly. That is, the transistor Tp1a functions as an amplifier that amplifies and detects the level of the output signal from the multiplexer MUX.

The gate of transistor Tp2 is connected to the drain of the transistor Tp1. The source of the transistor Tp2 and the source of the transistor Tp1 are commonly connected to the source of the transistor Tn1. The drain of the transistor Tp2 is connected to the drain of the transistor Tn2. When the transistor Tp1 changes from conductive to non-conductive, the transistor Tp2 changes from non-conductive to conductive, that is, is reversed, and inverts the drain voltage of the transistor Tp2 from a low level to a high level.

The transistor Tn2 is connected between the drain of the transistor Tp1 and the ground GND, and functions as a constant current source to cause a constant current to flow through the transistor Tp1. The transistor Tn3 is connected between the drain of the transistor Tp2 and the ground GND, and functions as a constant current source to cause a constant current to flow through the transistor Tp2.

The AZ switch SwAZ is connected between the gate of the transistor Tp1 and the gate of the transistor Tp2, and performs an auto-zero operation to equalize the potential between the gate and drain of the transistor Tp1 before the detection of an output signal of the sample-and-hold circuit 125.

The output circuit 121b includes p-type transistors Tp3 and Tp4 and n-type transistors Tn4 and Tn5. The transistor Tp3 is connected between the power supply VDD and an output terminal OUT121 of the comparator 121. The transistor Tn5 is connected between the source of transistor Tn4 and the ground GND. The gates of transistors Tp3 and Tn5 are commonly connected to each other. The transistors Tp3 and Tn5 have the role of fixing the output OUT121 at a high level during periods other than the count period. The transistors Tp4 and Tn4 are connected in series between the power supply VDD and the drain of the transistor Tn5. A node between the transistor Tp4 and the transistor Tn4 serves as the output terminal OUT121. The gates of the transistors Tp4 and Tn4 are commonly connected to the output of the input comparison circuit 121a (the drain of the transistor Tp2). The transistors Tp4 and Tn4 function as an inverter circuit.

When the drain voltage of the transistor Tp2 is inverted from a low level to a high level, the output terminal OUT of the comparator 121 is inverted from a high level to a low level by the transistors Tp4 and Tn4. The inversion of the voltage level of the output terminal OUT121 is used to stop the operation of the counter 122. As a result, AD conversion is possible.

Figure 13:
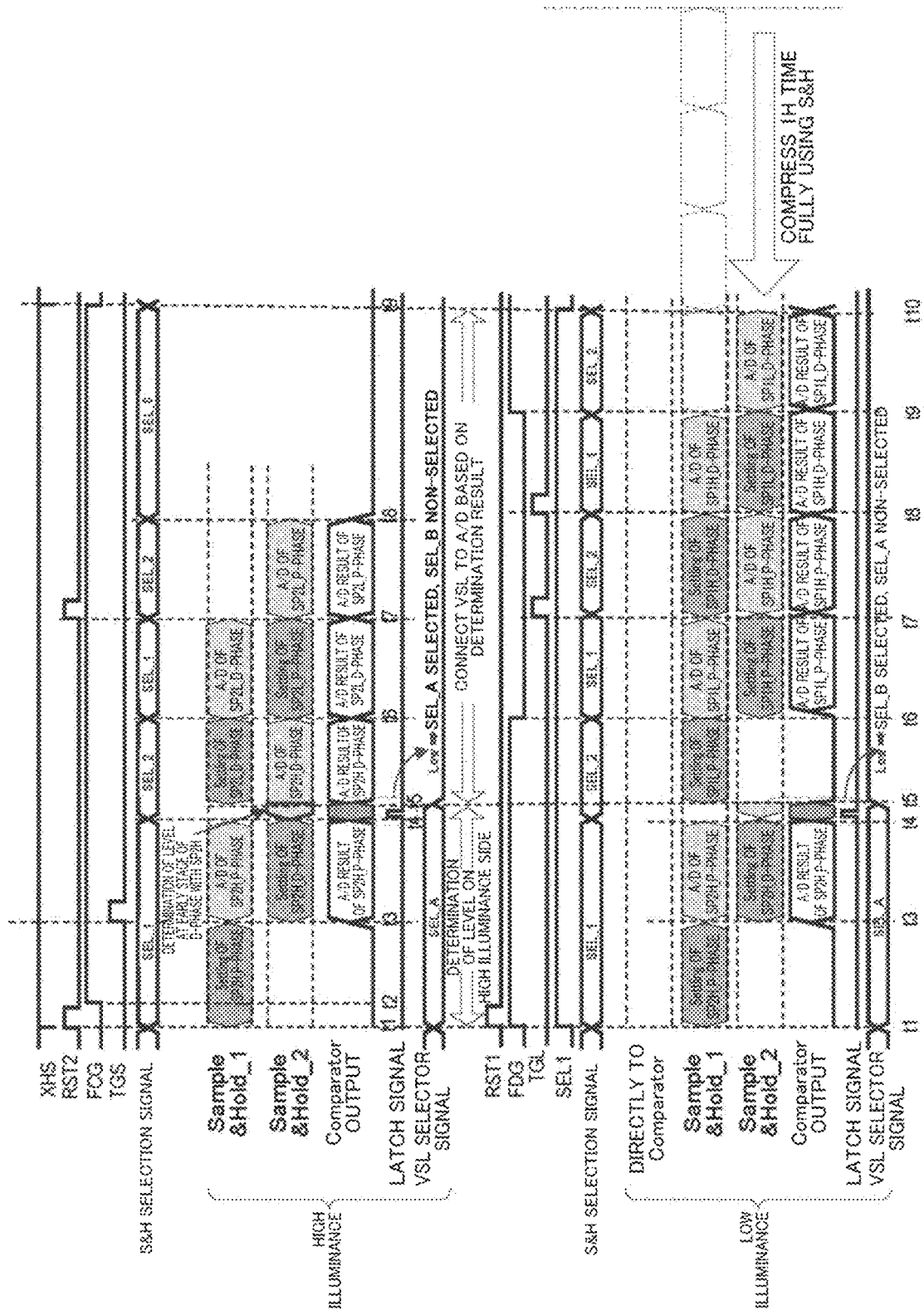
FIG. 13 is a timing diagram of the imaging device of FIG. 12.

FIG. 13 is a timing diagram of the imaging device 100 of FIG. 12. Similar to FIG. 7, the upper half of FIG. 13 illustrates timings for high illuminance, and the lower half illustrates timings for low illuminance.

At the time of starting imaging, the VSL selector 11 selects the second pixel signal on the vertical signal line VSL_A and outputs the second pixel signal to the vertical signal line VSL. At time t1, the switches Sw1 and Sw3 in the first hold circuit SHC1 are turned on, and the switch Sw2 is turned off. As a result, the first hold circuit SHC1 samples the second pixel signal. The second pixel signal to be sampled is at the SP2H reset level. At this time, the first hold circuit SHC1 maintains the sampling until the potential of the second floating diffusion region FD15b becomes stable. The period during which the first hold circuit SHC1 maintains the sampling is a settling period. On the other hand, at time t1, the switches Sw4 to Sw6 in the second hold circuit SHC2 are off. Therefore, the second hold circuit SHC2 does not perform the settling operation on the first pixel signal at time t1.

At time t3, the switches Sw1 and Sw3 in the first hold circuit SHC1 are turned off, and the switch Sw2 is turned on. As a result, the sampled second pixel signal is sent to the ADC 105a for AD conversion to generate data of the SP2H reset level.

Further, at time t3, the switches Sw4 and Sw6 in the second hold circuit SHC2 are turned on, and the switch Sw5 is turned off. As a result, the second hold circuit SHC2 samples the second pixel signal. The second pixel signal to be sampled is at the SP2H data (pixel signal) level.

At time t4, the switches Sw4 and Sw6 in the second hold circuit SHC2 are turned off, and the switch Sw5 is turned on. As a result, the sampled second pixel signal is sent to the ADC 105a for AD conversion to generate data of the SP2H data (pixel signal) level.

Meanwhile, the comparator 121 determines the illuminance based on the SP2H data (pixel signal) level. The upper half of FIG. 13 illustrates timings for a case where the comparator 121 determines that the illuminance is high. If it is determined that the illuminance is high, the VSL selector 11 continues to select the second pixel signal without changing the selection target. At time t5, the first hold circuit SHC1 turns on the switches Sw1 and Sw3 and turns off the switch Sw2. As a result, the first hold circuit SHC1 samples the second pixel signal. The sampled second pixel signal is at the SP2L data (pixel signal) level. Further, the second hold circuit SHC2 continues to turn on the switches Sw4 and Sw6 and turn off the switch Sw5, as with those at time t4. As a result, the ADC 105a generates data of the SP2H data (pixel signal) level.

Thereafter, at time t6, the first hold circuit SHC1 turns off the switches Sw1 and Sw3 and turns on the switch Sw2. As a result, the second pixel signal sampled by the first hold circuit SHC1 is sent to the ADC 105a for AD conversion to generate data of the SP2L data (pixel signal) level. On the other hand, the second hold circuit SHC2 turns on the switches Sw4 and Sw6 and turns off the switch Sw5. As a result, the second hold circuit SHC2 samples the second pixel signal. The second pixel signal to be sampled is at the SP2L reset level.

Thereafter, at time t7, the first hold circuit SHC1 turns off the switches Sw1 to Sw3. In addition, the second hold circuit SHC2 turns off the switches Sw4 and Sw6 and turns on the switch Sw5. As a result, the second pixel signal sampled by the second hold circuit SHC2 is sent to the ADC 105a for AD conversion to generate data of the SP2L reset level.

On the other hand, if the comparator 121 determines that the illuminance is low in a period of time t4 to time t5, operations according to the timings illustrated in the lower half of FIG. 13 are performed. If it is determined that the illuminance is low, the output signal of the comparator 121 remains at a high level, and accordingly, the output signal of the latch 13 becomes a high level. Thus, the VSL selector 11 switches the selection to the first pixel signal and outputs the first pixel signal to the vertical signal line VSL.

At time t5, the first hold circuit SHC1 turns on the switches Sw1 and Sw3 and turns off the switch Sw2. As a result, the first hold circuit SHC1 samples the first pixel signal. The first pixel signal sampled is at the SP1L reset level. On the other hand, the second hold circuit SHC2 turns off the switches Sw4 to Sw6 at time t5.

At time t6, the first hold circuit SHC1 turns off the switches Sw1 and Sw3 and turns on the switch Sw2. As a result, the first pixel signal sampled by the first hold circuit SHC1 is sent to the ADC 105a for AD conversion to generate data of the SP1L reset level. In addition, the second hold circuit SHC2 turns on the switches Sw4 and Sw6 and turns off the switch Sw5. As a result, the second hold circuit SHC2 samples the first pixel signal. The first pixel signal sampled is at the SP1H reset level.

At time t7, the first hold circuit SHC1 turns on the switches Sw1 and Sw3 and turns off the switch Sw2. As a result, the first hold circuit SHC1 samples the first pixel signal. The first pixel signal sampled is the SP1H data (pixel signal) level. In addition, the second hold circuit SHC2 turns off the switches Sw4 and Sw6 and turns on the switch Sw5. As a result, the second pixel signal sampled by the second hold circuit SHC2 is sent to the ADC 105a for AD conversion to generate data of the SP1H reset level.

At time t8, the first hold circuit SHC1 turns off the switches Sw1 and Sw3 and turns on the switch Sw2. As a result, the first pixel signal sampled by the first hold circuit SHC1 is sent to the ADC 105a for AD conversion to generate data of the SP1H data (pixel signal) level. In addition, the second hold circuit SHC2 turns on the switches Sw4 and Sw6 and turns off the switch Sw5. As a result, the second hold circuit SHC2 samples the first pixel signal. The first pixel signal sampled is at the SP1L data (pixel signal) level.

At time t9, the first hold circuit SHC1 turns off the switches Sw1 to Sw3. In addition, the second hold circuit SHC2 turns off the switches Sw4 and Sw6 and turns on the switch Sw5. As a result, the second pixel signal sampled by the second hold circuit SHC2 is sent to the ADC 105a for AD conversion to generate data of the SP1L data (pixel signal) level.

If a pixel signal is held in the sample-and-hold circuit 125 as illustrated in FIG. 12, and AD conversion is performed on the pixel signal after being held, the digital pixel data after AD conversion may be affected by noise and offset caused by capacitors and transistors. Therefore, at least one or some of the pixel signals may be sent to the ADC 105a without going through the sample-and-hold circuit 125.

Figure 14:
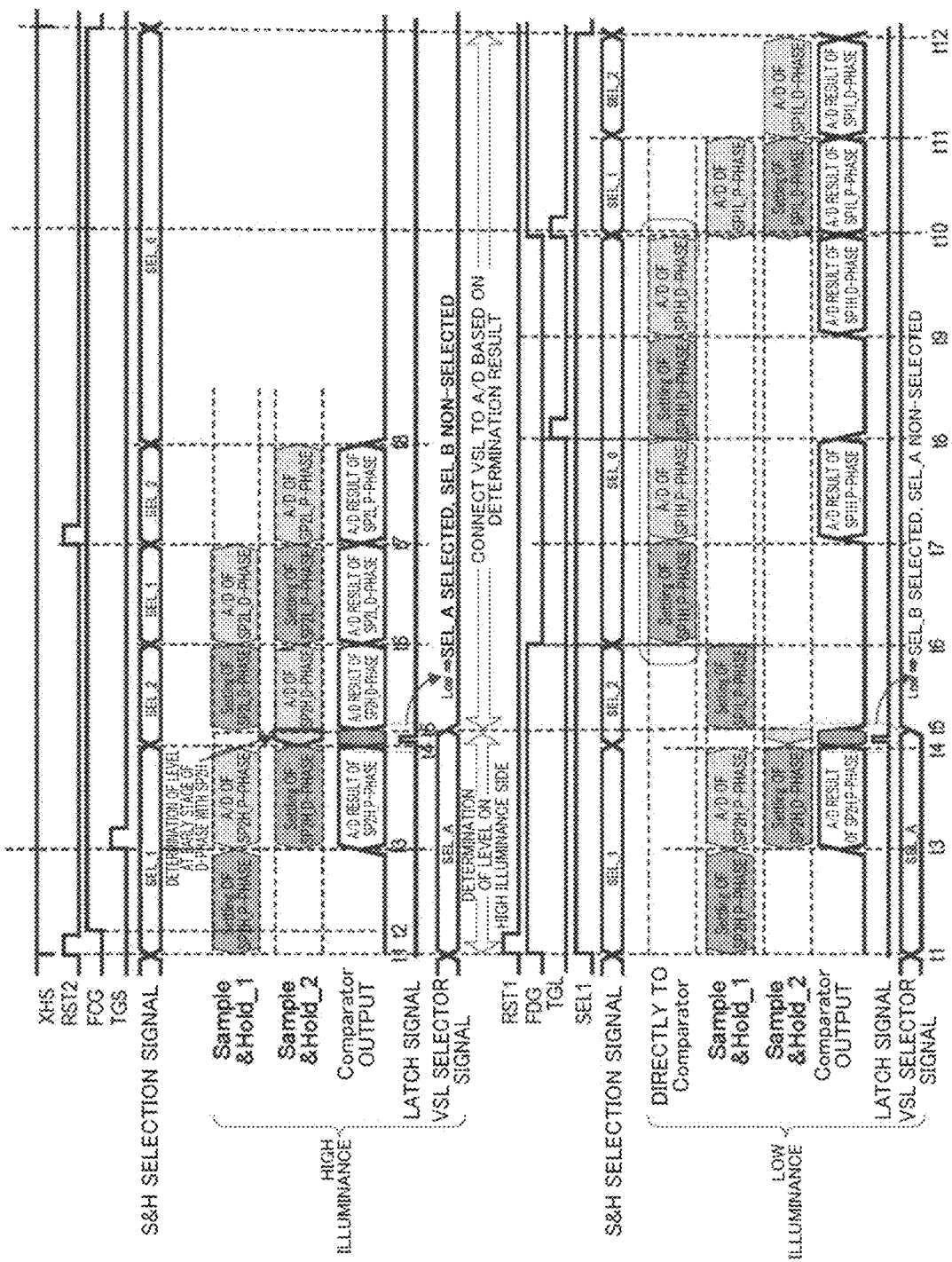
FIG. 14 is a timing diagram of a modification example of FIG. 13.

FIG. 14 is a timing diagram according to a modification example of FIG. 13. The upper half of FIG. 14 illustrates timings for the case where the illuminance is determined to be high, and the lower half illustrates timings for the case where the illuminance is determined to be low. The timings in the upper half of FIG. 14 are the same as those in the upper half of FIG. 13, and thus the description thereof will be omitted.

If the comparator 121 determines that the illuminance is low within a period of time t4 to time t5, the VSL selector 11 switches the selection to the first pixel signal and outputs the first pixel signal to the vertical signal line VSL. At time t5, the first hold circuit SHC1 turns on the switches Sw1 and Sw3 and turns off the switch Sw2 to sample the first pixel signal. The first pixel signal sampled is at the SP1L reset level. In addition, the second hold circuit SHC2 turns off the switches Sw4 to Sw6 during a period of time t5 to time t10.

At time t6, the first pixel signal generated within the pixel PX is directly sent to the ADC 105a through the VSL selector 11. This first pixel signal corresponds to the SP1H reset level. Since it takes time to stabilize the potential of the first floating diffusion region FD15a within the pixel PX, the first pixel signal is continuously sent to the ADC 105a during a period of time t6 to time t7. The period of time t6 to time t7 is a settling period for the first pixel signal. At time t7, the ADC 105a performs AD conversion on the first pixel signal to generate data of the SP1H reset level.

At time t8, the first pixel signal generated within the pixel PX is directly sent to the ADC 105a through the VSL selector 11. This first pixel signal corresponds to the data (pixel signal) level of SP1H. Since it takes time to stabilize the potential of the first floating diffusion region FD15a within the pixel PX, the first pixel signal is continuously sent to the ADC 105a during a period of time t8 to time t9. The period of time t8 to time t9 is a settling period for the first pixel signal. At time t9, the ADC 105a performs AD conversion on the first pixel signal to generate data of the SP1H data (pixel signal) level.

At time t10, the first hold circuit SHC1 turns off the switches Sw1 and Sw3 and turns on the switch Sw2. As a result, the first pixel signal sampled by the first hold circuit SHC1 at time t5 is sent to the ADC 105a for AD conversion to generate data of the SP1L reset level. In addition, the second hold circuit SHC2 turns on the switches Sw4 and Sw6 and turns off the switch Sw5. As a result, the second hold circuit SHC2 samples the first pixel signal. The first pixel signal sampled is at the SP1L data (pixel signal) level.

At time t11, the first hold circuit SHC1 turns off the switches Sw1 to Sw3. In addition, the second hold circuit SHC2 turns off the switches Sw4 and Sw6 and turns on the switch Sw5. As a result, the second pixel signal sampled by the second hold circuit SHC2 is sent to the ADC 105a for AD conversion to generate data of the SP1L data (pixel signal) level.

In this way, in the imaging device 100 of FIG. 12, the first hold circuit SHC1 and the second hold circuit SHC2 in the sample-and-hold circuit 125 alternately sample pixel signals, and one of the first hold circuit SHC1 and the second hold circuit SHC2 performs settling of the pixel signal while the other sends to the ADC 105a the pixel signal on which settling has been performed. As a result, AD conversion can be performed without being rate-limited due to the settling time of pixel signals. As with the imaging device 100 of FIG. 6, the imaging device 100 of FIG. 12 determines the illuminance using the first photoelectric conversion unit PD11a, which has a small light-receiving area, and performs AD conversion a plurality of times to match the determined illuminance, so that the frame rate can be increased. In addition, it is not necessary to frequently switch pixel signals on the vertical signal line VSL, so that power consumption can be reduced.

(Sectional Structure of Imaging Device 100)

Figure 15:
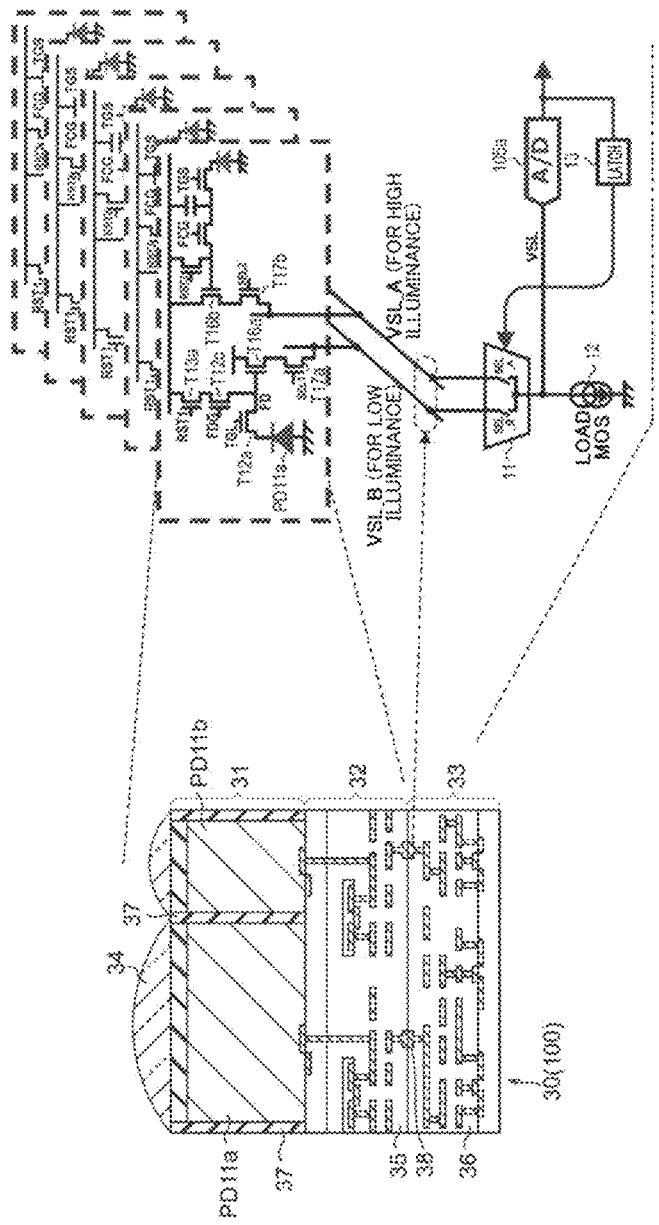
FIG. 15 is a cross-sectional view of a semiconductor chip that builds in the imaging device according to the first or second embodiment.

The imaging device 100 according to the first or second embodiment can be realized with one semiconductor chip. FIG. 15 is a cross-sectional view of a semiconductor chip 30 that builds in the imaging device 100 according to the first or second embodiment. The semiconductor chip 30 of FIG. 15 includes roughly three semiconductor sections (hereinafter referred to as first to third semiconductor sections 31 to 33). The first to third semiconductor sections 31 to 33 are stacked in order, and each semiconductor section may be formed of a plurality of semiconductor layers.

In the first semiconductor section 31 on the light incident surface side, the first photoelectric conversion unit PD11a, which has a large light-receiving area and a second photoelectric conversion unit PD11b, which has a small light-receiving area are arranged for each pixel PX. A part of the read-out circuit may be arranged in the first semiconductor section 31. An on-chip lens 34 is arranged over the light incident surface side of the first photoelectric conversion unit PD11a and the second photoelectric conversion unit PD11b. A light shielding layer 37 is arranged between the first photoelectric conversion unit PD11a and the second photoelectric conversion unit PD11b.

At least a part of the read-out circuit (for example, an amplifier transistor, a selection transistor, etc.) of each pixel PX is arranged in the second semiconductor section 32. The ADC group 105 and others are arranged in the third semiconductor section 33.

The first semiconductor section 31 and the second semiconductor section 32 are stacked on a first substrate 35, for example. The third semiconductor section 33 is formed on a second substrate 36, for example. The first substrate 35 and the second substrate 36 are bonded together using Cu—Cu connections 38, vias, bumps, or the like.

(Plan Layout of Imaging Device 100)

Figure 16:
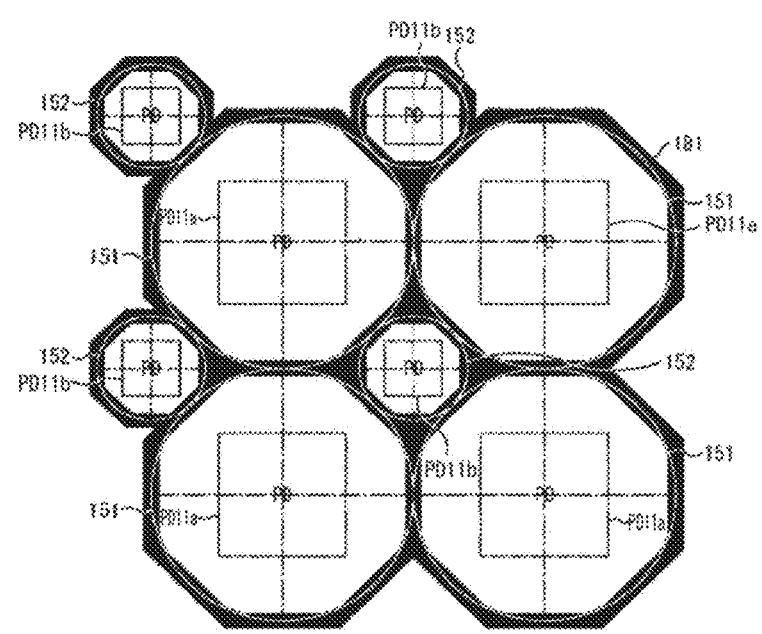
FIG. 16 is a plan layout of the light incident surface side of the imaging device according to the first and second embodiments.

FIG. 16 is a plan layout of the light incident surface side of the imaging device 100 according to the first and second embodiments. As illustrated in FIG. 16, a first on-chip lens 151 is arranged over the rectangular first photoelectric conversion unit PD11a. An inter-pixel light shield unit 181 is arranged, surrounding the first photoelectric conversion unit PD11a. The outer shape of the inter-pixel light-shield unit 181 is octagonal, and there is a gap between adjacent inter-pixel light-shield units. The rectangular second photoelectric conversion unit PD11b is arranged in this gap. A second on-chip lens 152 is arranged over the second photoelectric conversion unit PD11b.

Figure 17:
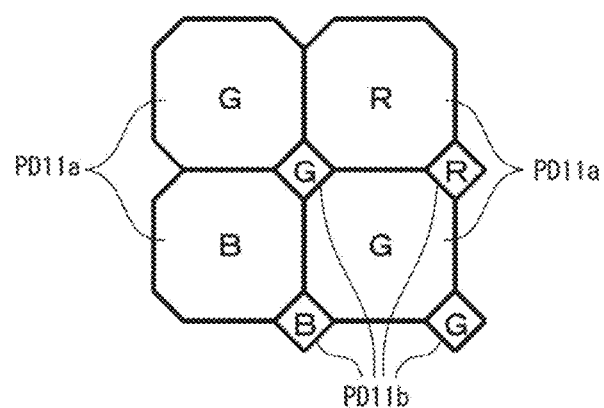
FIG. 17 is a plan layout of a modification example.

FIG. 16 is an example of the plan layout, and the layout is not limited thereto. FIG. 17 is a plan layout of a modification example. The shape of the inter-pixel light-shield unit in FIG. 16 is almost a regular octagon, while the shape in FIG. 17 is an octagon formed by cutting the four corners of a rectangle. Further, the inter-pixel light shield unit for the second photoelectric conversion unit PD11b is square instead of octagonal.

<Application to Moving Object>

The technology of the present disclosure (the present technology) can be applied to various products. For example, the technology according to the present disclosure may be realized as a device mounted on any type of moving body such as an automobile, an electric automobile, a hybrid electric automobile, a motorcycle, a bicycle, a personal mobility device, an airplane, a drone, a ship, and a robot.

Figure 18:
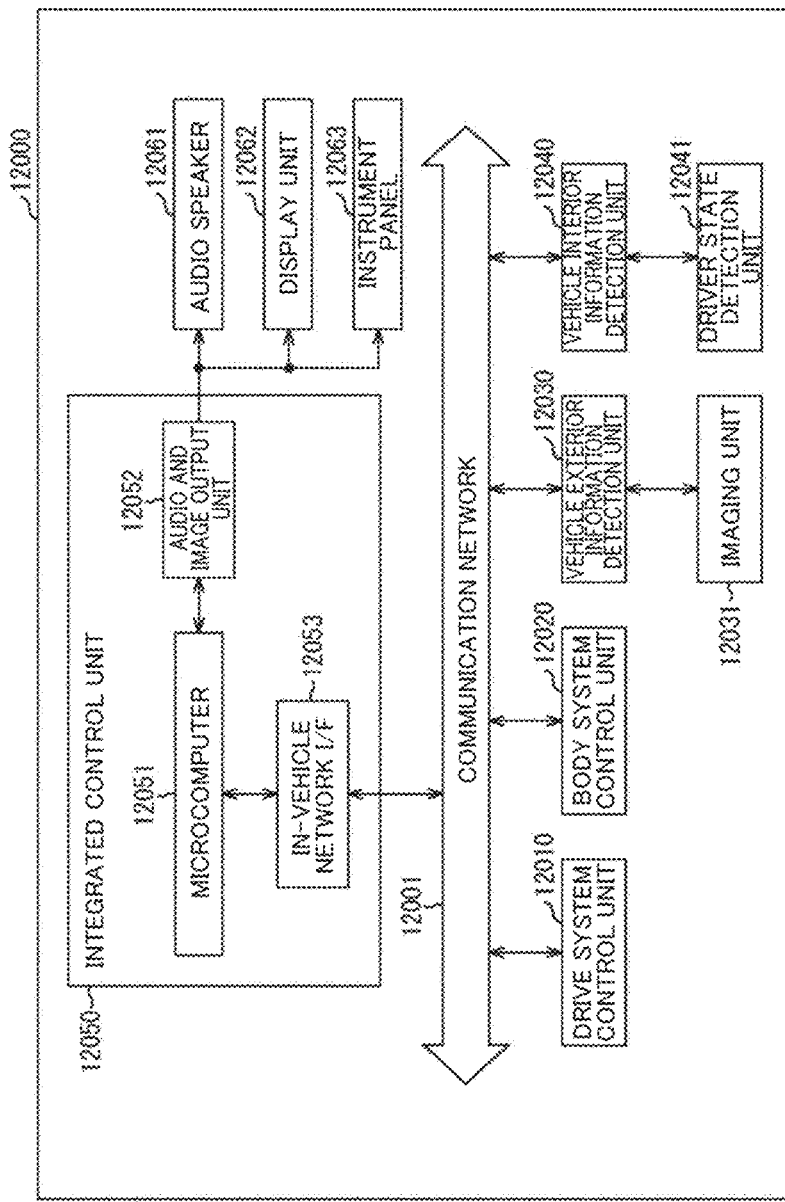
FIG. 18 is a block diagram illustrating an example of an overall configuration of a vehicle control system.

FIG. 18 is a block diagram illustrating a schematic configuration example of a vehicle control system that is an example of a moving body control system to which the technology according to the present disclosure can be applied.

A vehicle control system 12000 includes a plurality of electronic control units connected to each other over a communication network 12001. In the example illustrated in FIG. 18, the vehicle control system 12000 includes a drive system control unit 12010, a body system control unit 12020, a vehicle exterior information detection unit 12030, a vehicle interior information detection unit 12040, and an integrated control unit 12050. A microcomputer 12051, an audio and image output unit 12052, and an in-vehicle network I/F (interface) 12053 are illustrated as the functional configuration of the integrated control unit 12050.

The drive system control unit 12010 controls operations of devices related to a drive system of a vehicle in accordance with various programs. For example, the drive system control unit 12010 functions as a control device for a driving force generation device for generating the driving force of the vehicle such as an internal combustion engine or a drive motor, a driving force transmission mechanism for transmitting the driving force to the wheels, a steering mechanism for adjusting the steering angle of the vehicle, a braking device for generating the braking force of the vehicle, or the like.

The body system control unit 12020 controls operations of various devices mounted in the vehicle body in accordance with various programs. For example, the body system control unit 12020 functions as a control device of a keyless entry system, a smart key system, a power window device, or various lamps such as a headlamp, a back lamp, a brake lamp, a turn signal, and a fog lamp. In this case, radio waves transmitted from a portable device that substitutes for a key or signals of various switches may be input to the body system control unit 12020. The body system control unit 12020 receives inputs of the radio waves or signals and controls a door lock device, a power window device, and a lamp of the vehicle.

The vehicle exterior information detection unit 12030 detects information outside the vehicle in which the vehicle control system 12000 is mounted. For example, an imaging unit 12031 is connected to the vehicle exterior information detection unit 12030. The vehicle exterior information detection unit 12030 causes the imaging unit 12031 to capture an image outside the vehicle and receives the captured image. The vehicle exterior information detection unit 12030 may perform object detection processing or distance detection processing for people, cars, obstacles, signs, and letters on the road on the basis of the received image.

The imaging unit 12031 is an optical sensor that receives light and outputs an electrical signal according to the amount of light received. The imaging unit 12031 can also output the electrical signal as an image or distance measurement information. In addition, the light received by the imaging unit 12031 may be visible light or invisible light such as infrared light.

The vehicle interior information detection unit 12040 detects information on the inside of the vehicle. For example, a driver state detection unit 12041 that detects a driver's state is connected to the vehicle interior information detection unit 12040. The driver state detection unit 12041 includes, for example, a camera that captures an image of a driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate control target values for the driving force generation device, the steering mechanism, or the braking device based on the information on the inside and outside of the vehicle obtained by the vehicle exterior information detection unit 12030 or the vehicle interior information detection unit 12040, and output control commands to the drive system control unit 12010. For example, the microcomputer 12051 can perform coordinated control for the purpose of implementing functions of an advanced driver assistance system (ADAS) including vehicle collision avoidance, impact mitigation, following traveling based on an inter-vehicle distance, constant vehicle speed driving, vehicle collision warnings, and lane departure warning.

Further, the microcomputer 12051 can perform cooperative control for the purpose of automated driving or the like in which autonomous travel is performed without depending on operations of the driver, by controlling the driving force generation device, the steering mechanism, or the braking device and the like on the basis of information about the surroundings of the vehicle, the information being acquired by the vehicle exterior information detection unit 12030 or the vehicle interior information detection unit 12040.

In addition, the microcomputer 12051 can output a control command to the body system control unit 12030 based on the information on the outside of the vehicle acquired by the vehicle exterior information detection unit 12030. For example, the microcomputer 12051 can perform coordinated control for the purpose of antiglare such as switching a high beam to a low beam by controlling a headlamp according to a position of a preceding vehicle or an oncoming vehicle detected by the vehicle exterior information detection unit 12030.

The audio and image output unit 12052 transmits an output signal of at least one of sound and an image to an output device capable of visually or audibly notifying a passenger or the outside of the vehicle of information. In the example illustrated in FIG. 18, as such an output device, an audio speaker 12061, a display unit 12062, and an instrument panel 12063 are illustrated. The display unit 12062 may include, for example, at least one of an onboard display and a head-up display.

Figure 19:
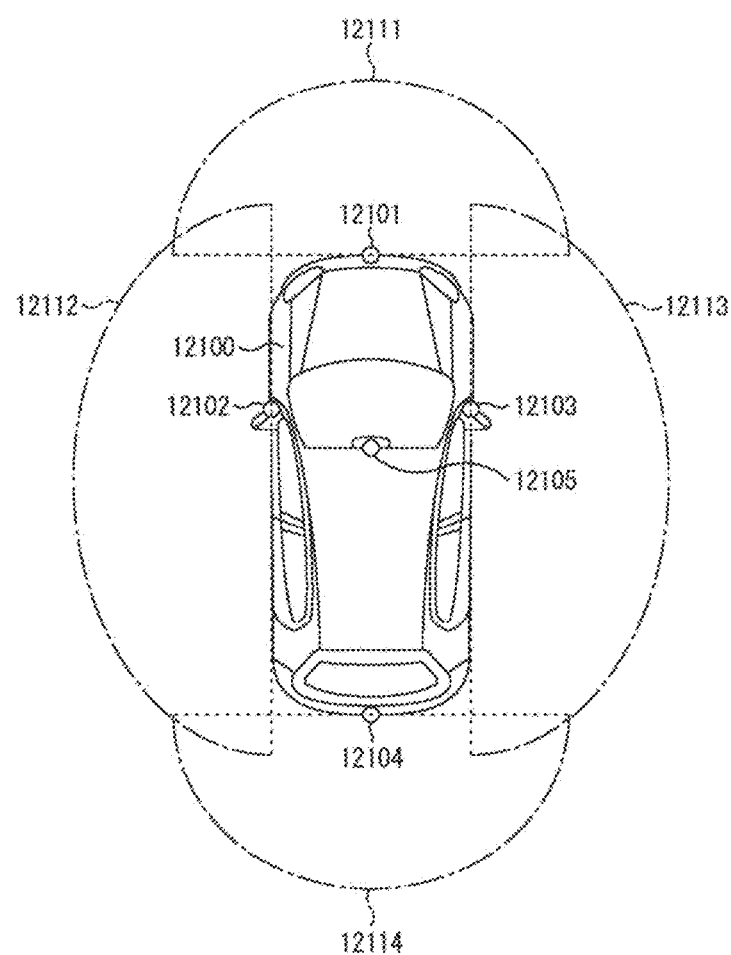
FIG. 19 is an explanatory diagram illustrating an example of positions at which vehicle exterior information detection units and imaging units are installed.

FIG. 19 is a diagram illustrating an example of positions at which imaging units 12031 are installed.

In FIG. 19, the imaging unit 12031 includes imaging units 12101, 12102, 12103, 12104, and 12105.

The imaging units 12101, 12102, 12103, 12104, and 12105 are provided at, for example, positions of a front nose, side mirrors, a rear bumper, a back door, an upper portion of a vehicle internal front windshield, and the like of the vehicle 12100. The imaging unit 12101 provided on a front nose and the imaging unit 12105 provided in an upper portion of the vehicle internal front windshield mainly acquire images in front of the vehicle 12100. The imaging units 12102 and 12103 provided in the side mirrors mainly acquire images on the lateral sides of the vehicle 12100. The imaging unit 12104 included in the rear bumper or the back door mainly acquires an image of an area behind the vehicle 12100. The imaging unit 12105 included in the upper portion of the windshield inside the vehicle is mainly used for detection of a preceding vehicle, a pedestrian, an obstacle, a traffic signal, a traffic sign, a lane, or the like.

FIG. 19 illustrates an example of imaging ranges of the imaging units 12101 to 12104. An imaging range 12111 indicates an imaging range of the imaging unit 12101 provided at the front nose, imaging ranges 12112 and 12113 respectively indicate the imaging ranges of the imaging units 12102 and 12103 provided at the side-view mirrors, and an imaging range 12114 indicates the imaging range of the imaging unit 12104 provided at the rear bumper or the back door. For example, a bird's-eye view image of the vehicle 12100 as viewed from above can be obtained by superimposing pieces of image data captured by the imaging units 12101 to 12104.

At least one of the imaging units 12101 to 12104 may have a function for obtaining distance information. For example, at least one of the imaging units 12101 to 12104 may be a stereo camera constituted by a plurality of imaging elements or may be an imaging element that has pixels for phase difference detection.

For example, the microcomputer 12051 can extract, particularly, a closest three-dimensional object on a path through which the vehicle 12100 is traveling, which is a three-dimensional object traveling at a predetermined speed (for example, 0 km/h or higher) in the substantially same direction as the vehicle 12100, as a preceding vehicle by obtaining a distance to each three-dimensional object in the imaging ranges 12111 to 12114 and temporal change in the distance (a relative speed with respect to the vehicle 12100) based on distance information obtained from the imaging units 12101 to 12104. The microcomputer 12051 can also set a following distance to the preceding vehicle to be maintained in advance and perform automatic brake control (including following stop control) and automatic acceleration control (including following start control). It is therefore possible to perform coordinated control for the purpose of, for example, automated driving in which the vehicle travels in an automated manner without requiring the driver to perform operations.

For example, the microcomputer 12051 can classify and extract three-dimensional data regarding three-dimensional objects into two-wheeled vehicles, normal vehicles, large vehicles, pedestrians, and other three-dimensional objects such as electric poles based on distance information obtained from the imaging units 12101 to 12104 and can use the three-dimensional data to perform automated avoidance of obstacles. For example, the microcomputer 12051 differentiates surrounding obstacles of the vehicle 12100 into obstacles which can be viewed by the driver of the vehicle 12100 and obstacles which are difficult to view. Then, the microcomputer 12051 determines a collision risk indicating the degree of risk of collision with each obstacle, and when the collision risk is equal to or greater than a set value and there is a possibility of collision, an alarm is output to the driver through the audio speaker 12061 or the display unit 12062, forced deceleration or avoidance steering is performed through the drive system control unit 12010, and thus it is possible to perform driving support for collision avoidance.

At least one of the imaging units 12101 to 12104 may be an infrared camera that detects infrared rays. For example, the microcomputer 12051 can recognize a pedestrian by determining whether there is a pedestrian in the captured image of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating an outline of an object to determine whether or not the object is a pedestrian. When the microcomputer 12051 determines that there is a pedestrian in the captured images of the imaging units 12101 to 12104 and the pedestrian is recognized, the audio and image output unit 12052 controls the display unit 12062 so that a square contour line for emphasis is superimposed and displayed with the recognized pedestrian. In addition, the audio and image output unit 12052 may control the display unit 12062 so that an icon indicating a pedestrian or the like is displayed at a desired position.

An example of the vehicle control system to which the technology according to the present disclosure can be applied has been described above. The technology according to the present disclosure may be applied to the imaging unit 12031 and others among the above-described configurations. Specifically, the imaging device 100 of the present disclosure can be applied to the imaging unit 12031. By applying the technology according to the present disclosure to the imaging unit 12031, a clearer captured image can be obtained, which makes it possible to reduce driver fatigue.

The present technology can have the following configurations.

(1) An imaging device, including:
a first photoelectric conversion unit:
a first read-out circuit that outputs to a first signal line a first pixel signal corresponding to charges photoelectrically converted by the first photoelectric conversion unit;
a second photoelectric conversion unit that has a smaller light-receiving area than the first photoelectric conversion unit;
a second read-out circuit that outputs to a second signal line a second pixel signal corresponding to charges photoelectrically converted by the second photoelectric conversion unit;
a pixel signal selector that selects the first pixel signal or the second pixel signal based on a result of comparing the second pixel signal with a reference signal; and
an analog-to-digital converter that converts the pixel signal selected by the pixel signal selector into a digital pixel signal by comparing the pixel signal with a reference signal whose potential level changes over time.

(2) The imaging device according to (1), including a plurality of pixels that are arranged in a first direction and a second direction,
wherein the first pixel signal and the second pixel signal that are output from each of two or more pixels arranged in the second direction are output to the first signal line that is common and the second signal line that is common, respectively,
the analog-to-digital converter is arranged for each pixel column including the two or more pixels arranged in the second direction,
each of the plurality of pixels includes the first photoelectric conversion unit, the first read-out circuit, the second photoelectric conversion unit, and the second read-out circuit, and
the pixel signal selector is provided for each pixel column arranged in the second direction.

(3) The imaging device according to (1) or (2), wherein the analog-to-digital converter includes
a comparator that compares the pixel signal selected by the pixel signal selector with the reference signal, and
a counter that performs a count operation until the comparator detects a match between the pixel signal and the reference signal, and
the analog-to-digital converter generates based on a count value of the counter the digital pixel signal corresponding to the pixel signal selected by the pixel signal selector.

(4) The imaging device according to (3), wherein
the comparator determines whether or not an illuminance at start of imaging is equal to or greater than a predetermined reference level, based on a comparison between the pixel signal selected by the pixel signal selector and the reference signal, and
the pixel signal selector selects the second pixel signal when the illuminance at start of imaging is equal to or greater than the reference level, and selects the first pixel signal when the illuminance is less than the reference level.

(5) The imaging device according to (4), including:
a first floating diffusion region that accumulates charges photoelectrically converted by the first photoelectric conversion unit; and
a second floating diffusion region that accumulates charges photoelectrically converted by the second photoelectric conversion unit, and
wherein the pixel signal selector selects the first pixel signal or the second pixel signal based on a result of comparing, by the comparator, with the reference signal, the second pixel signal corresponding to the charges photoelectrically converted by the second photoelectric conversion unit and accumulated in the second floating diffusion region.

(6) The imaging device according to (5), wherein
at start of imaging, the comparator performs first comparison processing that compares with the reference signal the second pixel signal corresponding to a potential of the second floating diffusion region in a state in which the charges in the second floating diffusion region have been discharged, and then performs second comparison processing that compares with the reference signal the second pixel signal corresponding to the charges photoelectrically converted by the second photoelectric conversion unit and accumulated in the second floating diffusion region, and the pixel signal selector selects the first pixel signal or the second pixel signal based on a result of the second comparison processing.

(7) The imaging device according to (6), wherein
the comparator determines whether or not the illuminance at start of imaging is equal to or greater than the reference level by the second comparison processing, and
the pixel signal selector selects the second pixel signal when the illuminance is equal to or greater than the reference level, and selects the first pixel signal when the illuminance is less than the reference level.

(8) The imaging device according to (7), wherein when the illuminance is determined to be equal to or greater than the reference level in the second comparison processing, the comparator performs third comparison processing that compares with the reference signal the second pixel signal corresponding to the charges photoelectrically converted by the second photoelectric conversion unit and accumulated in the second floating diffusion region, and then performs fourth comparison processing that compares with the reference signal the second pixel signal corresponding to a potential of the second floating diffusion region in a state in which the charges in the second floating diffusion region have been discharged.

(9) The imaging device according to (7) or (8), wherein the first read-out circuit has variable charge-voltage conversion efficiency, and when the illuminance is determined to be less than the reference level in the second comparison processing, the comparator performs fifth comparison processing that compares with the reference signal the first pixel signal corresponding to a potential of the first floating diffusion region in a state in which the charges in the first floating diffusion region have been discharged, then performs sixth comparison processing that compares with the reference signal the first pixel signal corresponding to a potential of the first floating diffusion region in a state in which the charges in the first floating diffusion region have been discharged with a higher charge-potential conversion efficiency than in the fifth comparison processing, then performs seventh comparison processing that compares with the reference signal the first pixel signal corresponding to the charges photoelectrically converted by the first photoelectric conversion unit with a same charge-potential conversion efficiency as in the sixth comparison processing, and then performs eighth comparison processing that compares with the reference signal the first pixel signal corresponding to the charges photoelectrically converted by the first photoelectric conversion unit with a same charge-potential conversion efficiency as in the fifth comparison processing.

(10) The imaging device according to any one of (6) to (9), wherein the comparator includes
a first differential transistor pair that compares the pixel signal selected by the pixel signal selector with the reference signal when the illuminance is determined to be less than the reference level in the second comparison processing, and
a second differential transistor pair that compares the pixel signal selected by the pixel signal selector with the reference signal when the first comparison processing is performed and when the illuminance is determined to be equal to or greater than the reference level in the second comparison processing.

(11) The imaging device according to (10), wherein
the first differential transistor pair includes a first transistor and a second transistor,
the second differential transistor pair includes a third transistor and a fourth transistor, and
the comparator includes
a first switch and a first capacitor that are connected in series between a gate of the first transistor and an output node of the pixel signal selector,
a second switch and a second capacitor that are connected in series between a gate of the second transistor and an input node for the reference signal,
a third switch and a third capacitor that are connected in series between a gate of the third transistor and an output node of the pixel signal selector,
a fourth switch and a fourth capacitor that are connected in series between a gate of the fourth transistor and an input node for the reference signal,
a fifth switch that switches whether or not to short-circuit the gate and a drain of the first transistor,
a sixth switch that switches whether or not to short-circuit the gate and a drain of the second transistor,
a seventh switch that switches whether or not to short-circuit the gate and a drain of the third transistor, and
an eighth switch that switches whether or not to short-circuit the gate and a drain of the fourth transistor.

(12) The imaging device according to (11), wherein at start of imaging at each pixel, the comparator turns off the first switch, the second switch, the third switch, and the fourth switch, and turns on the fifth switch and the sixth switch, and turns on once and then turns off the seventh switch and the eighth switch to accumulate charges corresponding to the second pixel signal selected by the pixel signal selector in the third capacitor and to accumulate charges corresponding to the reference signal in the fourth capacitor.

(13) The imaging device according to (1) or (2), including a sample-and-hold circuit that includes
a first hold circuit and a second hold circuit that alternately hold the pixel signal selected by the pixel signal selector, and
a sample-and-hold selector that alternately selects and outputs the pixel signals held by the first and second hold circuits, and
the analog-to-digital converter converts an output signal of the sample-and-hold circuit into the digital pixel signal.

(14) The imaging device according to (13), wherein during a period in which one of the first and second hold circuits inputs the held pixel signal to the analog-to-digital converter, the other of the first and second hold circuits holds the pixel signal selected by the pixel signal selector.

(15) The imaging device according to (13) or (14), wherein the analog-to-digital converter includes
a comparator that compares an output signal of the sample-and-hold circuit with the reference signal, and
a counter that performs a count operation until the comparator detects a match between the output signal and the reference signal, and
the analog-to-digital converter generates based on a count value of the counter the digital pixel signal corresponding to the pixel signal selected by the pixel signal selector.

(16) The imaging device according to (15), wherein
the comparator determines whether or not an illuminance at start of imaging is equal to or greater than a predetermined reference level, based on a comparison between the output signal of the sample-and-hold circuit and the reference signal, and the pixel signal selector selects the second pixel signal when the illuminance at start of imaging is equal to or greater than the reference level, and selects the first pixel signal when the illuminance is less than the reference level.

(17) The imaging device according to (16), including:
a first floating diffusion region that accumulates charges photoelectrically converted by the first photoelectric conversion unit; and
a second floating diffusion region that accumulates charges photoelectrically converted by the second photoelectric conversion unit, and
wherein the pixel signal selector selects the first pixel signal or the second pixel signal based on a result of comparing, by the comparator, with the reference signal, the second pixel signal corresponding to the charges photoelectrically converted by the second photoelectric conversion unit and accumulated in the second floating diffusion region.

(18) The imaging device according to (17), wherein
at start of imaging, the first hold circuit holds the second pixel signal corresponding to a potential of the second floating diffusion region in a state in which the charges in the second floating diffusion region have been discharged, and then inputs the held second pixel signal to the comparator,
the second hold circuit holds, in synchronization with a timing at which the first hold circuit inputs the second pixel signal to the comparator, the second pixel signal corresponding to the charges photoelectrically converted by the second photoelectric conversion unit and accumulated in the second floating diffusion region, and then inputs the held second pixel signal to the comparator, and the pixel signal selector selects the first pixel signal or the second pixel signal based on a result of comparing, by the comparator, the second pixel signal output from the second hold circuit with the reference signal.

(19) The imaging device according to (16), wherein
the sample-and-hold circuit is configured to output at least one or some of pixel signals selected by the pixel signal selector without holding the at least one or some of pixel signals, and
when the comparator determines that the second pixel signal is less than the reference signal, the sample-and-hold circuit inputs at least one or some of pixel signals selected by the pixel signal selector to the comparator without holding the at least one or some of pixel signals.

(20) An electronic apparatus, including:
an imaging device that outputs a digital pixel signal corresponding to a pixel signal obtained by imaging; and
a signal processing unit that performs signal processing based on the digital pixel signal,
wherein the imaging device includes
a first photoelectric conversion unit;
a first read-out circuit that outputs to a first signal line a first pixel signal corresponding to charges photoelectrically converted by the first photoelectric conversion unit;
a second photoelectric conversion unit that has a smaller light-receiving area than the first photoelectric conversion unit;
a second read-out circuit that outputs to a second signal line a second pixel signal corresponding to charges photoelectrically converted by the second photoelectric conversion unit;
a pixel signal selector that selects the first pixel signal or the second pixel signal based on a result of comparing the second pixel signal with a reference signal; and
an analog-to-digital converter that converts the pixel signal selected by the pixel signal selector into a digital pixel signal by comparing the pixel signal with a reference signal whose potential level changes over time.

Aspects of the present disclosure are not limited to the aforementioned individual embodiments and include various modifications that those skilled in the art can achieve, and effects of the present disclosure are also not limited to the details described above. In other words, various additions, modifications, and partial deletions can be made without departing from the conceptual ideas and spirit of the present disclosure that can be derived from the details defined in the claims and the equivalents thereof.

REFERENCE SIGNS LIST

1 Solid-state imaging device
11 VSL selector
12 VSL boost circuit
13 Latch
14 First signal selector
15 Second signal selector
16 Fourth signal selector
16 Third signal selector
17 Fourth signal selector
18 First differential transistor pair
19 Second differential transistor pair
20 Current mirror circuit
21 Current source
22 Output circuit
30 Semiconductor chip
31 First semiconductor section
32 Second semiconductor section
33 Third semiconductor section
34 On Chip lens
35 First substrate
36 Second substrate
37 Light shielding layer
38 Cu—Cu connection
100 Imaging device
101 Pixel array unit
102 Timing control circuit
103 Vertical scanning circuit
104 Charge accumulation unit
105 ADC group
106 Horizontal transfer scanning circuit
107 Amplifier circuit
108 Signal processing circuit
109 Pixel drive line
110 Vertical signal line
111 Horizontal transfer line
114 Reference signal line
121 Comparator
121a Input comparison circuit
121b Output circuit
122 Counter
123 Latch circuit
125 Sample-and-hold circuit
151 First on-chip lens 152 Second on-chip lens
181 Inter-pixel light shield unit
310 Negative capacitance circuit
511 Semiconductor chip
512 Semiconductor chip
513 Via region
514 Via region
516 Logic circuit
517 Peripheral circuit

The invention claimed is:

1. An imaging device, comprising:
a first photoelectric conversion unit;
a first read-out circuit that outputs to a first signal line a first pixel signal corresponding to charges photoelectrically converted by the first photoelectric conversion unit;
a second photoelectric conversion unit that has a smaller light-receiving area than the first photoelectric conversion unit;
a second read-out circuit that outputs to a second signal line a second pixel signal corresponding to charges photoelectrically converted by the second photoelectric conversion unit;
a pixel signal selector that selects the first pixel signal or the second pixel signal based on a result of comparing the second pixel signal with a reference signal; and
an analog-to-digital converter that converts the selected first pixel signal or the second pixel signal selected by the pixel signal selector into a digital pixel signal by comparing the selected first pixel signal or the second pixel signal with a reference signal whose potential level changes over time.

2. The imaging device according to claim 1, comprising a plurality of pixels that are arranged in a first direction and a second direction, wherein
the first pixel signal and the second pixel signal that are output from each of two or more pixels arranged in the second direction are output to the first signal line that is common and the second signal line that is common, respectively,
the analog-to-digital converter is arranged for each pixel column including the two or more pixels arranged in the second direction,
each of the plurality of pixels includes the first photoelectric conversion unit, the first read-out circuit, the second photoelectric conversion unit, and the second read-out circuit, and
the pixel signal selector is provided for the each pixel column arranged in the second direction.

3. The imaging device according to claim 1, wherein
the analog-to-digital converter includes
a comparator that compares the selected first pixel signal or the second pixel signal selected by the pixel signal selector with the reference signal, and
a counter that performs a count operation until the comparator detects a match between the pixel signal and the reference signal, and
the analog-to-digital converter generates based on a count value of the counter the digital pixel signal corresponding to the selected first pixel signal or the second pixel signal selected by the pixel signal selector.

4. The imaging device according to claim 3, wherein
the comparator determines whether or not an illuminance at start of imaging is equal to or greater than a predetermined reference level, based on a comparison between the selected first pixel signal or the selected pixel signal selected by the pixel signal selector and the reference signal, and
the pixel signal selector selects the second pixel signal when the illuminance at start of imaging is equal to or greater than the predetermined reference level, and selects the first pixel signal when the illuminance is less than the predetermined reference level.

5. The imaging device according to claim 4, comprising:
a first floating diffusion region that accumulates charges photoelectrically converted by the first photoelectric conversion unit; and
a second floating diffusion region that accumulates charges photoelectrically converted by the second photoelectric conversion unit,
wherein the pixel signal selector selects the first pixel signal or the second pixel signal based on a result of comparing, by the comparator, with the reference signal, the second pixel signal corresponding to the charges photoelectrically converted by the second photoelectric conversion unit and accumulated in the second floating diffusion region.

6. The imaging device according to claim 5, wherein
at start of imaging, the comparator performs first comparison processing that compares with the reference signal the second pixel signal corresponding to a potential of the second floating diffusion region in a state in which the charges in the second floating diffusion region have been discharged, and then performs second comparison processing that compares with the reference signal the second pixel signal corresponding to the charges photoelectrically converted by the second photoelectric conversion unit and accumulated in the second floating diffusion region, and
the pixel signal selector selects the first pixel signal or the second pixel signal based on a result of the second comparison processing.

7. The imaging device according to claim 6, wherein
the comparator determines whether or not the illuminance at start of imaging is equal to or greater than the predetermined reference level by the second comparison processing, and
the pixel signal selector selects the second pixel signal when the illuminance is equal to or greater than the predetermined reference level, and selects the first pixel signal when the illuminance is less than the predetermined reference level.

8. The imaging device according to claim 7, wherein
when the illuminance is determined to be equal to or greater than the predetermined reference level in the second comparison processing, the comparator performs third comparison processing that compares with the reference signal the second pixel signal corresponding to the charges photoelectrically converted by the second photoelectric conversion unit and accumulated in the second floating diffusion region, and then performs fourth comparison processing that compares with the reference signal the second pixel signal corresponding to a potential of the second floating diffusion region in a state in which the charges in the second floating diffusion region have been discharged.

9. The imaging device according to claim 7, wherein
the first read-out circuit has variable charge-voltage conversion efficiency, and
when the illuminance is determined to be less than the predetermined reference level in the second comparison processing, the comparator performs fifth comparison processing that compares with the reference signal the first pixel signal corresponding to a potential of the first floating diffusion region in a state in which the charges in the first floating diffusion region have been discharged, then performs sixth comparison processing that compares with the reference signal the first pixel signal corresponding to a potential of the first floating diffusion region in a state in which the charges in the first floating diffusion region have been discharged with a higher charge-potential conversion efficiency than in the fifth comparison processing, then performs seventh comparison processing that compares with the reference signal the first pixel signal corresponding to the charges photoelectrically converted by the first photoelectric conversion unit with a same charge-potential conversion efficiency as in the sixth comparison processing, and then performs eighth comparison processing that compares with the reference signal the first pixel signal corresponding to the charges photoelectrically converted by the first photoelectric conversion unit with a same charge-potential conversion efficiency as in the fifth comparison processing.

10. The imaging device according to claim 6, wherein the comparator includes
a first differential transistor pair that compares the selected first pixel signal or the second pixel signal selected by the pixel signal selector with the reference signal when the illuminance is determined to be less than the predetermined reference level in the second comparison processing, and
a second differential transistor pair that compares the selected first pixel signal or the second pixel signal selected by the pixel signal selector with the reference signal when the first comparison processing is performed and when the illuminance is determined to be equal to or greater than the predetermined reference level in the second comparison processing.

11. The imaging device according to claim 10, wherein the first differential transistor pair includes a first transistor and a second transistor,
the second differential transistor pair includes a third transistor and a fourth transistor, and
the comparator includes
a first switch and a first capacitor that are connected in series between a gate of the first transistor and an output node of the pixel signal selector,
a second switch and a second capacitor that are connected in series between a gate of the second transistor and an input node for the reference signal,
a third switch and a third capacitor that are connected in series between a gate of the third transistor and the output node of the pixel signal selector,
a fourth switch and a fourth capacitor that are connected in series between a gate of the fourth transistor and the input node for the reference signal,
a fifth switch that switches whether or not to short-circuit the gate and a drain of the first transistor,
a sixth switch that switches whether or not to short-circuit the gate and a drain of the second transistor,
a seventh switch that switches whether or not to short-circuit the gate and a drain of the third transistor, and
an eighth switch that switches whether or not to short-circuit the gate and a drain of the fourth transistor.

12. The imaging device according to claim 11, wherein at start of imaging at each pixel, the comparator turns off the first switch, the second switch, the third switch, and the fourth switch, and turns on the fifth switch and the sixth switch, and turns on once and then turns off the seventh switch and the eighth switch to accumulate charges corresponding to the second pixel signal selected by the pixel signal selector in the third capacitor and to accumulate charges corresponding to the reference signal in the fourth capacitor.

13. The imaging device according to claim 1, comprising a sample-and-hold circuit that includes
a first hold circuit and a second hold circuit that alternately hold the selected first pixel signal or the second pixel signal selected by the pixel signal selector, and
a sample-and-hold selector that alternately selects and outputs the selected first pixel signals or the second pixel signal held by the first and second hold circuits,
wherein
the analog-to-digital converter converts an output signal of the sample-and-hold circuit into the digital pixel signal.

14. The imaging device according to claim 13, wherein during a period in which one of the first and second hold circuits inputs the held pixel signal to the analog-to-digital converter, the other of the first and second hold circuits holds the pixel signal selected by the pixel signal selector.

15. The imaging device according to claim 13, wherein the analog-to-digital converter includes
a comparator that compares the output signal of the sample-and-hold circuit with the reference signal, and
a counter that performs a count operation until the comparator detects a match between the output signal and the reference signal, and
the analog-to-digital converter generates based on a count value of the counter the digital pixel signal corresponding to the pixel signal selected by the pixel signal selector.

16. The imaging device according to claim 15, wherein the comparator determines whether or not an illuminance at start of imaging is equal to or greater than a predetermined reference level, based on a comparison between the output signal of the sample-and-hold circuit and the reference signal, and
the pixel signal selector selects the second pixel signal when the illuminance at start of imaging is equal to or greater than the predetermined reference level, and selects the first pixel signal when the illuminance is less than the predetermined reference level.

17. The imaging device according to claim 16, comprising:
a first floating diffusion region that accumulates charges photoelectrically converted by the first photoelectric conversion unit; and
a second floating diffusion region that accumulates charges photoelectrically converted by the second photoelectric conversion unit,
wherein the pixel signal selector selects the first pixel signal or the second pixel signal based on a result of comparing, by the comparator, with the reference signal, the second pixel signal corresponding to the charges photoelectrically converted by the second photoelectric conversion unit and accumulated in the second floating diffusion region.

18. The imaging device according to claim 17, wherein at start of imaging, the first hold circuit holds the second pixel signal corresponding to a potential of the second floating diffusion region in a state in which the charges in the second floating diffusion region have been discharged, and then inputs the held second pixel signal to the comparator, the second hold circuit holds, in synchronization with a timing at which the first hold circuit inputs the second pixel signal to the comparator, the second pixel signal corresponding to the charges photoelectrically converted by the second photoelectric conversion unit and accumulated in the second floating diffusion region, and then inputs the held second pixel signal to the comparator, and the pixel signal selector selects the first pixel signal or the second pixel signal based on a result of comparing, by the comparator, the second pixel signal output from the second hold circuit with the reference signal.

19. The imaging device according to claim 16, wherein the sample-and-hold circuit is configured to output at least one or some of pixel signals selected by the pixel signal selector without holding the at least one or some of pixel signals, and when the comparator determines that the second pixel signal is less than the reference signal, the sample-and-hold circuit inputs the at least one or some of pixel signals selected by the pixel signal selector to the comparator without holding the at least one or some of pixel signals.

20. An electronic apparatus, comprising:

an imaging device that outputs a digital pixel signal corresponding to a pixel signal obtained by imaging; and a signal processing unit that performs signal processing based on the digital pixel signal, wherein the imaging device includes
  a first photoelectric conversion unit;
  a first read-out circuit that outputs to a first signal line a first pixel signal corresponding to charges photoelectrically converted by the first photoelectric conversion unit;
  a second photoelectric conversion unit that has a smaller light-receiving area than the first photoelectric conversion unit;
  a second read-out circuit that outputs to a second signal line a second pixel signal corresponding to charges photoelectrically converted by the second photoelectric conversion unit;
  a pixel signal selector that selects the first pixel signal or the second pixel signal based on a result of comparing the second pixel signal with a reference signal; and
  an analog-to-digital converter that converts the selected first pixel signal or the second pixel signal selected by the pixel signal selector into a digital pixel signal by comparing the selected first pixel signal or the second pixel signal with a reference signal whose potential level changes over time.

* * * * *